United States Patent
Rovati et al.

(10) Patent No.: US 12,433,875 B2
(45) Date of Patent: Oct. 7, 2025

(54) (R)-4-(1-(6-(4-(TRIFLUOROMETHYL)BENZYL)-6-AZASPIRO[2.5]OCTANE-5-CARBOXAMIDO)-CYCLOPROPYL)BENZOIC ACID OR ITS SALT ALSO IN POLYMORPHIC FORM A FOR USE IN THE PREVENTION OF HETEROTOPIC OSSIFICATION

(71) Applicant: ROTTAPHARM BIOTECH S.R.L., Monza (IT)

(72) Inventors: Lucio Claudio Rovati, Monza (IT); Gianfranco Caselli, Milan (IT); Tiziana Piepoli, Milan (IT)

(73) Assignee: Rottapharm Biotech S.R.L., Monza (IT)

( * ) Notice: Subject to any disclaimer, the term of this patent is extended or adjusted under 35 U.S.C. 154(b) by 741 days.

(21) Appl. No.: 17/780,611

(22) PCT Filed: Nov. 27, 2020

(86) PCT No.: PCT/EP2020/083719
§ 371 (c)(1),
(2) Date: May 27, 2022

(87) PCT Pub. No.: WO2021/105419
PCT Pub. Date: Jun. 3, 2021

(65) Prior Publication Data
US 2023/0028519 A1 Jan. 26, 2023

(30) Foreign Application Priority Data
Nov. 29, 2019 (EP) .................... 19212463

(51) Int. Cl.
*A61K 31/438* (2006.01)
*A61P 19/08* (2006.01)
(52) U.S. Cl.
CPC ............ *A61K 31/438* (2013.01); *A61P 19/08* (2018.01)

(58) Field of Classification Search
CPC .............................. A61K 31/438; A61P 19/08
See application file for complete search history.

(56) References Cited

FOREIGN PATENT DOCUMENTS

WO 2020012305 A1 1/2020

OTHER PUBLICATIONS

Caselli, G. et al., "Chemical structure of CR6086", Retrieved from the Internet: URL:https://www.ncbi.nlm.nih.gov/pmc/articles/PMC5831858/pdf/13075_2018_Article_1537.pdf [retrieved on May 4, 2020], DOI: 10.1186/s13075-018-1537-8, Mar. 1, 2018, 1 pg.
Caselli, G. et al., "Pharmacological characterisation of CR6086, a potent prostaglandin E2 receptor 4 antagonist, as a new potential disease-modifying anti-rheumatic drug", Arthritis Res. & Ther., 20:39, https://doi.org/10.1186/s13075-018-1537-8, 2018, 1-19.
Chiusaroli, R. et al., "THU0066 CR6086, a Selective Antagonist at the EP4 Prostanoid Receptor, Improves or Resolves Disease Features in a RAT Model of Rheumatoid Arthritis", Retrieved from the Internet: URL:https://ard.bmj.com/content/74/Suppl_2/215.3 [retrieved on May 4, 2020], Poster Presentations. Rheumatoid arthritis— etiology, pathogenesis and animal models, Jan. 1, 2015, 1-6.
Nakagawa, K. et al., "Prostaglandin E2 EP4 agonist (ONO-4819) accelerates BMP-induced osteoblastic differentiation", Bone, 41(4), https://doi.org/10.1016/j.bone.2007.06.013, Sep. 14, 2007, 543-548.
Song, H-P. et al., "Phenotypic characterization of type II collagen-induced arthritis in Wistar rats", Experimental and Therapeutic Medicine, 10(4), https://doi.org/10.3892/etm.2015.2667, Jul. 31, 2015, 1483-1488.

*Primary Examiner* — Alicia L Otton
(74) *Attorney, Agent, or Firm* — Elmore Patent Law Group, P.C.; Joseph C. Zucchero; Carolyn S. Elmore

(57) ABSTRACT

There is described a compound of formula (R)-4-(1-(6-(4-(trifluoromethyl)benzyl)-6-azaspiro[2.5]octane-5-carboxamido)-cyclopropyl)benzoic acid or a pharmaceutically acceptable salt thereof or the form A of its sodium salt for use in the prevention of heterotopic ossification. Preferably such a compound is effective in a specific dose range.

14 Claims, 8 Drawing Sheets

(R)-4-(1-(6-(4-(TRIFLUOROMETHYL)BENZYL)-6-AZASPIRO[2.5]OCTANE-5-CARBOXAMIDO)-CYCLOPROPYL) BENZOIC ACID OR ITS SALT ALSO IN POLYMORPHIC FORM A FOR USE IN THE PREVENTION OF HETEROTOPIC OSSIFICATION

FIELD OF THE INVENTION

The present invention relates to the compound (R)-4-(1-(6-(4-(trifluoromethyl)benzyl)-6-azaspiro[2.5]octane-5-carboxamido)cyclopropyl)benzoic acid or a salt thereof, preferably the sodium salt, for use in the prevention of heterotopic ossification.

Surprisingly the inventors found out an effective dose of the compound (R)-4-(1-(6-(4-(trifluoromethyl)benzyl)-6-azaspiro [2.5] octane-5-carboxamido)-cyclopropyl)benzoic acid or a salt thereof for use in the prevention of heterotopic ossification.

BACKGROUND OF THE INVENTION

Pathologic heterotopic ossification, also named pathological heterotopic osteogenesis is the formation of bone in non-skeletal tissues including muscle, tendons, or other soft tissue and results from an alteration in the normal regulation of skeletogenesis. It is a pathological condition opposite to what occurs in other rheumatic disorders, such as rheumatoid arthritis. In the latter, in fact, the typical erosion of periarticular cortical bone is accompanied by the lack of repair, due to active suppression of bone formation by proinflammatory cytokines.

Heterotopic ossification, on the other hand, refers to the uncontrolled bone formation at extraosseous sites and can be categorized into three groups based on the initiating stimulus: trauma, tumors, and idiopathic causes.

In the trauma category, the formation of ectopic bone is concerned with major and minor traumatic incidents, surgery, burns, and other causes.

In the tumor category, direct and reactive pathologic bone formation is linked to the different neoplasms capable of ectopic bone formation.

The category of idiopathic causes involves the formation of pathologic bone following neurologic injury and in systemic ossification disorders.

More in details, heterotopic bone formation could be caused by mechanical, inflammatory, and metabolic stimuli and may be located in soft tissue. The heterotopic bone formation can occur in joints and periarticular tissues (enthesis, capsule, articular cartilage, synovium, ligaments, muscle, and fascia). Heterotopic bone can outgrow in continuity with existing bone (appositional bone). Conversely, in numerous cases heterotopic bone could grow in muscles, ligaments, capsule, and fascia in discontinuity with existing bone (ectopic bone deposition).

The conditions characterized by heretotopic ossification are very different and can be categorized in base of the nature of the process. For instance, Spondyloarthropathies, Para-articular Ossification, and Crystal-Induced Arthropathies are driven by inflammatory processes; Osteoarthritis by degenerative processes; Hyperparathyroidism, Drug-Induced Ossification (e.g. by retinoids, and vitamin A), and Ochronosis are mainly metabolic disorders; Diffuse Idiopathic Skeletal Hyperstosis is mainly driven by metabolic and probably by degenerative processes; Myositis Ossificans is driven by traumas. Some diseases such as Fibrodysplasia ossificans progressiva and, maybe, Synovial Endochromatosis have a genetic base.

Pathologic heterotopic ossification ranges from clinically nonsignificant coincidental radiographic findings to devastating clinical conditions that dramatically affect quality of life.

The control of heterotopic ossification is the therapeutic goal in all pathologies linked to pathological osteogenesis. This problem, as seen, encompasses different pathological conditions, from Myositis Ossificans Traumatica, which may develop after intramuscular hematoma from a sports-related injury and can be extremely debilitating by causing joint contractures and pain, to chronic arthritis such as Ankylosing Spondylitis and Psoriatic Arthritis, where ossification usually involves the joint tissue and the entheses. In the latter case, for example, restoration of joint integrity and joint function is the ultimate goal of therapy.

Concerning traumatic heterotopic ossification, the extraskeletal formation of lamellar bone largely occurs following traumatic injury, burn injury, spinal cord injury, traumatic burn injury, and soft tissue damage. It also frequently occurs after joint arthroplasty, and in soldiers with blast wounds. Heterotopic ossification is largely related to the inflammatory response to these injuries, which in turn causes ectopic bone formation through the up-regulation of pro-osteogenic genes and activation of osteopotent progenitor cells.

Concerning rheumatologic conditions characterized by pathological heterotopic ossification, recently the role of the immune system has begun to emerge as a relevant contributing factor. Several studies have shown how the inflammatory response is necessary for the formation of heterotopic ossification, and several specific cell populations, such as macrophages and mast cells, and the adaptive immune system, have been particularly implicated in heterotopic ossification development via interactions with osteoprogenitor cells and the release of osteogenic growth factors.

Targeting the processes underlying this pathologic bone formation remains a challenge for future therapeutic interventions in this group of arthritic diseases. Indeed, in these pathologies chronic joint inflammation is associated with eventual development of bone erosions; however, the development of bony nodules in Psoriatic Arthritis and Ankylosing Spondylitis are usually seen at sites different from erosions, suggesting an uncoupling of the osteoblast-osteoclast homeostasis that allows for regulated bone turnover and formation.

In WO2013/004290 selective EP4 receptor antagonists having analgesic and anti-inflammatory activity are proposed for the treatment of acute and chronic pain, osteoarthritis, rheumatoid arthritis, cancer endometriosis and migraine.

While for the treatment of the pain of bone diseases many compounds are proposed, the pathological condition of heterotopic ossification is still a severe condition with no treatment.

Once heterotopic ossification develops, surgical removal is actually the only effective treatment, followed by radiation or NSAIDs to prevent recurrence.

The object of the present invention is hence to prevent the heterotopic ossification, that is a pathological condition very severe in many different diseases.

SUMMARY OF THE INVENTION

The inventors surprisingly found out that the compound (R)-4-(1-(6-(4-(trifluoromethyl)benzyl)-6-azaspiro[2.5]octane-5-carboxamido)cyclopropyl)benzoic acid or a pharmaceutically acceptable salt thereof is capable to prevent the proliferation and hyperproliferation of osteoblasts that generate heteropic ossification.

Therefore, the present invention relates to (R)-4-(1-(6-(4-(trifluoromethyl)benzyl)-6C-azaspiro[2.5]octane-5-carboxamido)cyclopropyl)benzoic acid or a pharmaceutically acceptable salt thereof for use in the prevention of heterotopic ossification. Preferably the salt thereof is the sodium salt.

As it will be clear from the experimental part the sodium salt of (R)-4-(1-(6-(4-(trifluoromethyl)benzyl)-6-azaspiro[2.5]octane-5-carboxamido)cyclopropyl)benzoic acid as obtained was an amorphous compound. As described in European patent application EP19168253, not still published, the inventors found out a very stable crystalline form of sodium (R)-4-(1-(6-(4-(trifluoromethyl)benzyl)-6-azaspiro[2.5]octane-5-carboxamido)cyclopropyl)benzoate named as Form A.

Therefore in another aspect the invention concerns a polymorphic form A of sodium salt of (R)-4-(1-(6-(4-(trifluoromethyl)benzyl)-6-azaspiro[2.5]octane-5-carboxamido)cyclopropyl)benzoic acid characterized by a powder XRD spectrum with peaks at values of the angle 2θ±0.2° of 4.3, 5.0, 5.8, 6.4, 7.1, 8.3, 8.7, 12.8, 15.3, 15.9 for use in the prevention of heterotopic ossification.

In an advantageous aspect the invention relates to a dose range effective in preventing the heterotopic ossification.

Therefore, in a further aspect the invention concerns a pharmaceutical composition comprising (R)-4-(1-(6-(4-(trifluoromethyl)benzyl)-6-azaspiro[2.5]octane-5-carboxamido)cyclopropyl)benzoic acid, or its pharmaceutically acceptable salt or the above crystalline form A of the sodium salt and pharmaceutically acceptable excipients, wherein (R)-4-(1-(6-(4-(trifluoromethyl)benzyl)-6-azaspiro[2.5]octane-5-carboxamido)cyclopropyl)benzoic acid is in a dose in the range from 1 to 30, preferably 8 to 20 mg/kg for use in the prevention of heterotopic ossification.

In a more advantageous aspect, the dose of (R)-4-(1-(6-(4-(trifluoromethyl)benzyl)-6-azaspiro[2.5]octane-5-carboxamido)cyclopropyl)benzoic acid or of a pharmaceutically acceptable salt thereof or of the crystalline form A of the sodium salt, in the pharmaceutical composition for use in the prevention of heterotopic ossification, is 10 mg per kg of body weight.

In a still further preferred aspect the pathological condition of heterotopic ossification is prevented in a disease selected from the group consisting of Myositis Ossificans, Post-Surgical Heterotopic Ossification, Post-Injury Ossification, Osteosarcoma, Spondyloarthropathies (Ankylosing spondylitis and Psoriatic arthritis), Seronegative arthropathies, Diffuse idiopathic skeletal hyperostosis, Para-articular Ossification, and Crystal-Induced Arthropathies, Osteoarthritis driven by degenerative processes, Hyperparathyroidism, Drug-Induced Ossification, and Ochronotic, Diffuse Idiopathic Skeletal Hyperostosis (metabolic and degenerative processes); Fibro dysplasia ossificans progressive, Synovial Hemochromatosis and Progressive Osseous Heterolalia.

DESCRIPTION OF THE FIGURES

FIG. 11a illustrates the progression over the time of IL-1β-induced osteoblast proliferation in the presence of Form A. FIG. 11b illustrates the cumulative effect expressed as Area Under the Curve (AUC) of the data in the previous panel.

FIG. 12a is the spydergram illustrating the preferential inhibitory effect of the form A of the sodium salt of (R)-4-(1-(6-(4-(trifluoromethyl)benzyl)-6-azaspiro[2.5]octane-5-carboxamido)cyclopropyl)benzoic acid on Th17 polarization towards Th17 IL-17F memory cells induced by a stimulation with rIL-2 and rIL-21 (both at 5 ng/ml) in combination with anti-CD3 and anti-CD28 (both at 1.5 ng/ml) co-stimulated with PGE2 (30 nM) over a 48 hour. Stimulated cells were normalized to 100%.

FIG. 12b represents the percent of Th17 IL-17F memory cell stimulation (mean±sem) of cells taken by individual donors vs. their baseline levels in the absence or in the presence of 100 nM form A of the sodium salt of (R)-4-(1-(6-(4-(trifluoromethyl)benzyl)-6-azaspiro[2.5]octane-5-carboxamido)cyclopropyl)benzoic acid.

DETAILED DESCRIPTION OF THE INVENTION

Figure 1:
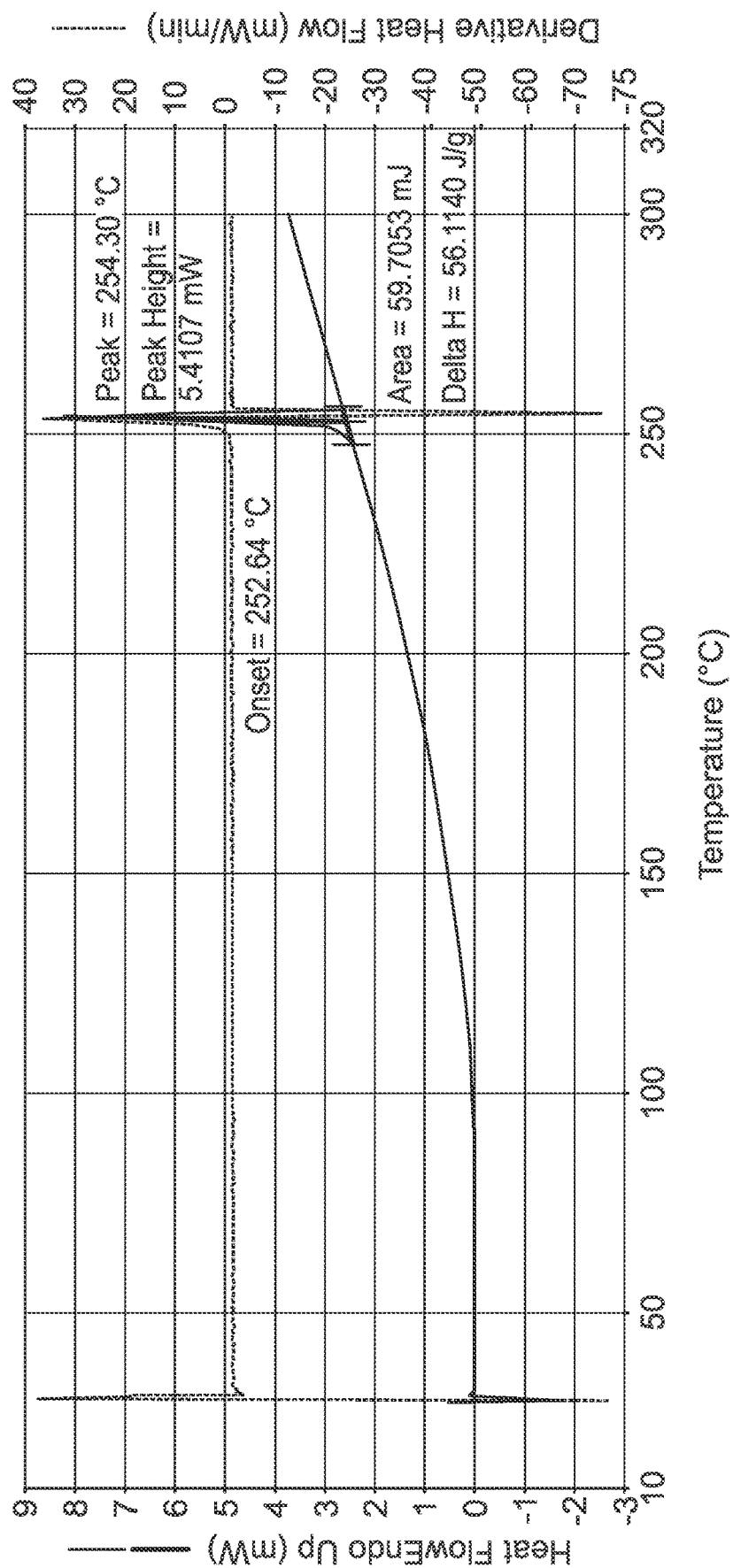
FIG. 1 reports the DSC graph of the crystalline form A of sodium (R)-4-(1-(6-(4-(trifluoromethyl)benzyl)-6-azaspiro[2.5]octane-5-carboxamido)cyclopropyl)benzoate FIG. 2 reports the IR spectrum of the crystalline form A of sodium (R)-4-(1-(6-(4-(trifluoromethyl)benzyl)-6-azaspiro[2.5]octane-5-carboxamido)cyclopropyl)benzoate.

The present invention relates to (R)-4-(1-(6-(4-(trifluoromethyl)benzyl)-6-azaspiro[2.5]octane-5-carboxamido)cyclopropyl)benzoic acid or a pharmaceutically acceptable salt thereof for use in the prevention of heterotopic ossification.

In a preferred aspect the invention relates to a polymorphic form A of sodium salt of (R)-4-(1-(6-(4-(trifluoromethyl)benzyl)-6-azaspiro[2.5]octane-5-carboxamido)cyclopropyl)benzoic acid characterized by a powder XRD spectrum with peaks at values of the angle 26±0.2° of 4.3, 5.0, 5.8, 6.4, 7.1, 8.3, 8.7, 12.8, 15.3, 15.9 for use in the prevention of heterotopic ossification.

In the present invention when the following terms are used:
"heterotopic ossification" or "heterotopic osteogenesis", it is meant the formation of bone tissue in the non-skeletal tissues including muscle, tendons, or other soft tissue,
"the compound of the invention" it is meant (R)-4-(1-(6-(4-(trifluoromethyl)benzyl)-6-azaspiro[2.5]octane-5-carboxamido)cyclopropyl)benzoic acid or a pharmaceutically acceptable salt, also its hydrates, solvates, and crystalline forms. The compound of the invention can be a pharmaceutically acceptable salt. Therefore, any acid addition salt or a salt with a base is included in the present invention, as long as they are pharmaceutically acceptable salts.

As examples salts derived from inorganic bases can be cited, including aluminum, ammonium, calcium, copper, ferric, ferrous, lithium, magnesium, manganese salts, manganous, potassium, sodium, zinc, and the like. Preferred are the ammonium, calcium, magnesium, lithium, potassium, and sodium salts. More preferably the compound is the sodium salt of (R)-4-(1-(6-(4-(trifluoromethyl)benzyl)-6-azaspiro[2.5]octane-5-carboxamido)cyclopropyl)benzoic acid.

Salts derived from pharmaceutically acceptable organic non-toxic bases can also di included such as salts of primary, secondary, and tertiary amines, substituted amines including naturally occurring substituted amines, cyclic amines, and basic ion exchange resins, such as arginine, betaine, caffeine, choline, N,N'-dibenzylethylenediamine, diethylamine, 2-diethyl-aminoethanol, 2-dimethylaminoethanol, ethanolamine, ethylenediamine, N-ethyl-morpholine, N-ethylpiperidine, glucamine, glucosamine, histidine, hydrabamine, isopropylamine, lysine, methyl-glucamine, morpholine, piperazine, piperidine, polyamine resins, procaine, purines, theobromine, triethylamine, trimethylamine, tripropylamine, tromethamine, and the like.

As it will be clear from the experimental part the sodium salt of (R)-4-(1-(6-(4-(trifluoromethyl)benzyl)-6-azaspiro[2.5]octane-5-carboxamido)cyclopropyl)benzoic acid as obtained was an amorphous compound. As described in European patent application XXXX, not still published, the inventors found out a very stable crystalline form of sodium (R)-4-(1-(6-(4-(trifluoromethyl)benzyl)-6-azaspiro[2.5]octane-5-carboxamido)cyclopropyl)benzoate named as Form A.

In a preferred aspect the invention hence relates the polymorphic form A of sodium salt of (R)-4-(1-(6-(4-(trifluoromethyl)benzyl)-6-azaspiro[2.5]octane-5-carboxamido) cyclopropyl)benzoic acid characterized by a powder XRD spectrum with peaks at values of the angle 26±0.2° of 4.3, 5.0, 5.8, 6.4, 7.1, 8.3, 8.7, 12.8, 15.3, 15.9 for use in the prevention of heterotopic ossification.

In an advantageous aspect the invention relates to a dose range effective in preventing the heterotopic ossification.

The compound for use of formula (R)-4-(1-(6-(4-(trifluoromethyl)benzyl)-6-azaspiro[2.5]octane-5-carboxamido)cyclopropyl)benzoic acid or its salt or its polymorphic form, preferably the crystalline form A of sodium (R)-4-(1-(6-(4-(trifluoromethyl)benzyl)-6-azaspiro[2.5]octane-5-carboxamido)cyclopropyl)-benzoate is preferably in a dose in the range from 1 to 30 mg/kg, more preferably is in a dose in the range from 8 to 20 mg/kg, still more preferably is in a dose of about 10 mg/kg.

In a further aspect the invention concerns a pharmaceutical composition comprising (R)-4-(1-(6-(4-(trifluoromethyl)benzyl)-6-azaspiro[2.5]octane-5-carboxamido)cyclopropyl)benzoic acid or a pharmaceutically acceptable salt thereof or the crystalline form A of the sodium salt and pharmaceutically acceptable excipients, wherein (R)-4-(1-(6-(4-(trifluoromethyl)benzyl)-6-azaspiro[2.5]octane-5-carboxamido)cyclopropyl)benzoic acid or a pharmaceutically acceptable salt thereof or the crystalline form A of its sodium salt and at least one pharmaceutically acceptable excipient for use in preventing the heterotopic ossification. Preferably, in the pharmaceutical composition of the invention (R)-4-(1-(6-(4-(trifluoromethyl)benzyl)-6-azaspiro[2.5]octane-5-carboxamido)cyclopropyl)benzoic acid or a pharmaceutically acceptable salt thereof or the crystalline form A of its sodium salt is in a dose in the range from 1 to 30, preferably 8 to 20 mg/kg for use in the prevention of heterotopic ossification.

In a more advantageous aspect, the dose of (R)-4-(1-(6-(4-(trifluoromethyl)benzyl)-6-azaspiro[2.5]octane-5-carboxamido)cyclopropyl)benzoic acid or a pharmaceutically acceptable salt thereof or the crystalline form A of its sodium salt for use in the prevention of heterotopic ossification is 10 mg per kg of body weight. The invention is directed to a method for preventing the heterotopic ossification in different conditions/diseases.

In the trauma category, the formation of ectopic bone is concerned with major and minor traumatic incidents, surgery, burns, and other causes. It comprises but it is not limited to Myositis Ossificans, Post Surgical Heterotopic Ossification, Post-Injury Ossification (comprising burn injury, spinal cord injury, traumatic burn injury), The category of idiopathic causes involves the formation of heterotopic ossification following neurologic injury and in systemic ossification disorders. The latter could be caused by mechanical, inflammatory, and metabolic stimuli and may be located in soft tissue. They comprise: Spondyloarthropathies (Ankylosing spondylitis and Psoriatic arthritis), Seronegative arthropathies, Diffuse idiopathic skeletal hyperostosis, Para-articular Ossification, and Crystal-Induced Arthropathies (which are driven mainly by inflammatory processes). Other idiopathic disease that can be cited are: osteoarthritis driven by degenerative processes, hyperparathyroidism, drug-Induced Ossification, and ochronosis (which are mainly metabolic disorders); diffuse Idiopathic Skeletal Hyperstosis (metabolic and degenerative processes); Fibrodysplasia ossificans progressive, Synovial Endochromatosis and Progressive Osseous Heteroplasia (are Genetic and developmental forms).

Therefore, in a still further preferred aspect the pathological condition of heterotopic ossification is prevented in a disease selected from the group consisting of Myositis Ossificans, Post Surgical Heterotopic Ossification, Post-Injury Ossification, Osteosarcoma, Spondyloarthropathies (Ankylosing spondylitis and Psoriatic arthritis), Seronegative arthropathies, Diffuse idiopathic skeletal hyperostosis, Para-articular Ossification, and Crystal-Induced Arthropathies, Osteoarthritis driven by degenerative processes, Hyperparathyroidism, Drug-Induced Ossification, and Ochronosis, Diffuse Idiopathic Skeletal Hyperstosis (metabolic and degenerative processes); Fibrodysplasia ossificans progressive, Synovial Endochromatosis and Progressive Osseous Heteroplasia.

The invention will be now detailed with reference to tests, paradigms and animal models showing the surprising effect of the invention.

EXPERIMENTAL PART

Example 1: Preparation of (R)-4-(1-(6-(4-(trifluoromethyl)benzyl)-6-azaspiro[2.5]octane-5-carboxamido)cyclopropyl)benzoic acid (Compound of Formula (IV) and of its Sodium Salt (Compound 1)

The compound was obtained following the synthetic steps as in the following scheme 1:

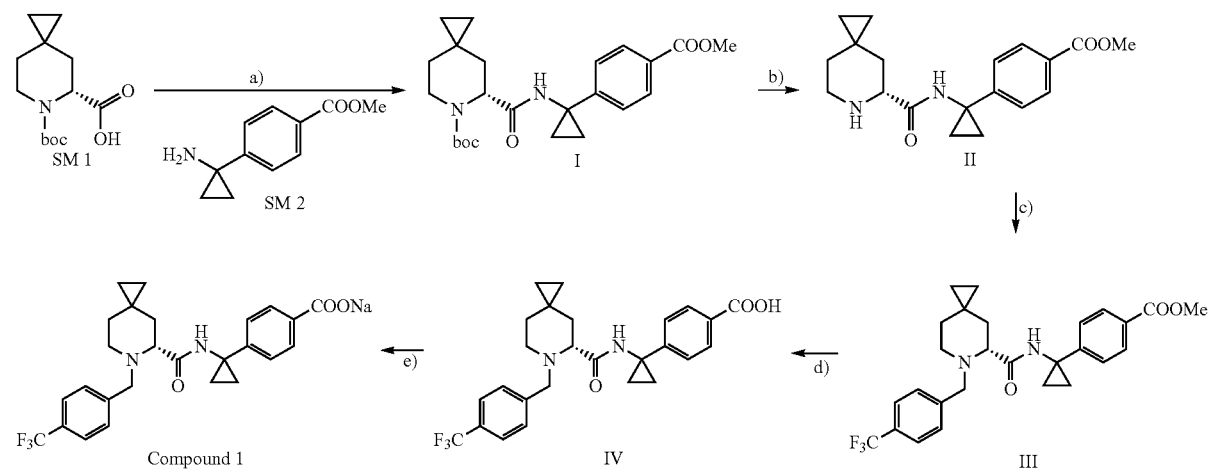

a) Conversion of the starting material (SM1) into compound of formula (I), using starting material (SM2) and a suitable coupling agent;
b) Deprotection of compound (I) in acidic media as TFA in DCM to obtain compound (II);
c) Alkylation of the nitrogen on the ring with a benzyl bromide in presence of a suitable base to obtain compound (III);
d) Hydrolysis of the methyl ester using a suitable inorganic base as NaOH to obtain compound (IV), i.e. R)-4-(1-(6-(4-(trifluoromethyl)benzyl)-6-azaspiro[2.5]octane-5-carboxamido)cyclopropyl)benzoic acid; and
e) Formation and Crystallization of the sodium salt in a suitable solvent.

Example 1a) Synthesis of Starting Material 1 (SM 1)

The starting material SM1 reported in the above scheme 1 was obtained by the following steps reported in the scheme 2 below:

e) Deprotection of the piperidine nitrogen using a reducing agent as hydrogen and palladium on charcoal in MeOH and subsequent protection using (BOC)$_2$O to obtain compound (XIII)
f) Hydrolysis of the methyl ester using a suitable inorganic base as LiOH in THF/MeOH to obtain (SM 1)

Synthesis of Intermediate (IX) 1-(tert-butyl) 2-methyl (R)-4-oxopiperidine-1,2-dicarboxylate With reference to scheme 2 the intermediate (IX) was prepared.
In a round bottom flask, (R)-1-(tert-butoxycarbonyl)-4-oxopiperidine-2-carboxylic acid (10 g; 0.041 mol) was dissolved in DMF (25 ml) and cooled to 3° C. Cesium carbonate (0.6 eq.) was added, then methyl iodide (1.1 eq) was added dropwise: after 2 h at RT, the mixture was diluted with water (250 ml) and extracted with AcOEt (3×150 ml). Combined organic layers were washed with water (150 ml×3), followed by brine (150 ml), dried over sodium sulphate, filtered and concentrated at 40° C. to get the title compound (9 g; 85%) as a light brown solid.

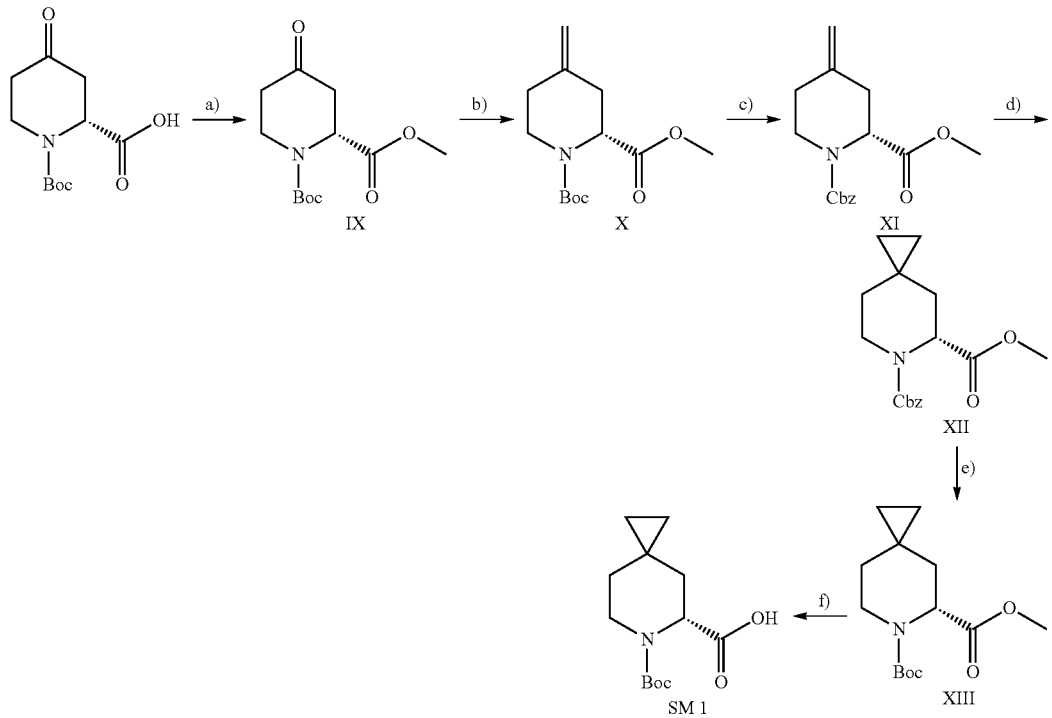

a) Conversion of (R)-1-(tert-butoxycarbonyl)-4-oxopiperidine-2-carboxylic acid (prepared according to *Thetrahedron* (1997) 15671-15680) into methyl ester (IX), using MeI and a suitable base as Cs$_2$CO$_3$
b) Wittig reaction using Methyl triphenyl phosphonium bromide in toluene to obtain compound (X)
c) Deprotection of the piperidine nitrogen using a suitable acidic reagent as HCl in MeOH and subsequent protection using Cbz chloride in DCM to obtain compound (XI)
d) Cyclopropane formation using an organometallic reagent as diethylzinc in THF, diiodomethane and TFA to obtain compound (XII)

1H NMR (400 MHz, CHLOROFORM-d) δ=5.28-4.75 (m, 1H), 4.13-4.03 (m, 1H), 3.76 (s, 3H), 3.72-3.55 (m, 1H), 2.92-2.70 (m, 2H), 2.53 (br s, 2H), 1.50 (br s, 9H) ESI+m/z 258 [M+H]$^+$

Synthesis of Intermediate (X) 1-(tert-butyl) 2-methyl (R)-4-methylenepiperidine-1,2-dicarboxylate With reference to scheme 2 the intermediate (X) was prepared.
Methyl triphenyl phosphonium bromide (1.1 eq) was dissolved in dry toluene (400 ml), cooled to 3° C. then a NaHMDS solution (1.05 eq) was slowly dropped. After 1 hour under nitrogen atmosphere at 3° C., intermediate (IX)

(9 g, 0.035 mol) in dry toluene (200 ml) was added and stirred for 1 hour. After completion, the reaction was quenched with ice/water (800 ml), the two layers were separated, organic layer was washed with water (350 ml) followed by brine (350 ml), dried over sodium sulphate and concentrated. The residue was purified by column chromatography using silica gel eluting with Hexane/AcOEt 95-5 to 60-40 to afford the title compound as a pale yellow solid (8 g; 90%) 1H NMR (400 MHz, CHLOROFORM-d) δ=5.12-4.76 (m, 3H), 4.27-3.97 (m, 1H), 3.73 (s, 3H), 3.23-2.92 (m, 1H), 2.86-2.69 (m, 1H), 2.57-2.38 (m, 1H), 2.21 (br s, 2H), 1.49 (br s, 9H). ESI+m/z 256 [M+H]$^+$ Synthesis of Intermediate (XI) 1-benzyl 2-methyl (R)-4-methylenepiperidine-1,2-dicarboxylate With reference to scheme 2 the intermediate (XI) was prepared.

Intermediate (X) (8 g; 0.031 mol) was dissolved in dry methanol (150 ml), cooled to 0° C., then 300 ml 3M methanolic HCl solution were added slowly. After 2 hours at RT solvent was evaporated to dryness, residue dissolved in DCM (250 ml), cooled to 0° C., then triethylamine (2.5 eq) and benzylchloroformate (1.2 eq) were added after 1 hour at RT. After completion, the reaction was quenched with ice-cold water; the two layers were separated and the organic layer was washed with water followed by brine solution (250 ml). The organic layer was dried over sodium sulphate and concentrated below 40° C. to get a residue that was purified by column chromatography using silica gel eluting with Hexane/AcOEt 95-5 to 60-40 to afford the title compound as a white solid (6.7 g; 74%).

1H NMR (400 MHz, CHLOROFORM-d) δ=7.45-7.30 (m, 5H), 5.24-4.93 (m, 3H), 4.83 (s, 2H), 4.31-4.13 (m, 1H), 3.84-3.62 (m, 3H), 3.26-3.03 (m, 1H), 2.86-2.74 (m, 1H), 2.55-2.43 (m, 1H), 2.34-2.17 (m, 2H). ESI+m/z 290 [M+H]$^+$

Synthesis of Intermediate (XII) 6-benzyl 5-methyl (R)-6-azaspiro [2.5]octane-5,6-dicarboxylate With reference to scheme 2 the intermediate (XII) was prepared.

DCM (150 ml) was cooled to 0° C., then diethyl zinc solution in THF (2.3 eq) was added slowly and stirred for 30 minutes. Trifluoro acetic acid (2.0 eq) was added slowly at 0° C. and stirred for 60 minutes, then diiodomethane (4.0 eq) was added and stirred for 60 minutes at 0° C. Intermediate (XI) (6 g; 0.02 mol) in dry dichloromethane (50 ml) was added slowly at 0° C., then left stirring at 25° C. for 20 hours. Reaction mass was quenched with 10% sodium bicarbonate solution (400 ml). The solid precipitate was filtered off, the layers were separated from the filtrate and the organic layer was washed with water (250 ml×2) followed by brine solution (250 ml). The organic layer was dried over sodium sulphate and concentrated below 40° C., obtaining a residue that was purified by column chromatography using silica gel eluting with Hexane/AcOEt 95-5 to 60-40 to afford the title compound as a white solid (4.72 g; 75%).

1H NMR (400 MHz, CHLOROFORM-d) δ ppm 0.03-0.47 (m, 78H) 0.76-0.92 (m, 1H) 1.26-1.48 (m, 1H) 1.49-1.70 (m, 2H) 1.75 (s, 1H) 1.88-2.04 (m, 1H) 2.19 (s, 1H) 2.35-2.41 (m, 1H) 3.17-3.39 (m, 1H) 3.61-3.83 (m, 3H) 4.14 (m, J=11.74 Hz, 1H) 4.96 (m, J=4.89 Hz, 1H) 5.12-5.25 (m, 2H) 7.15-7.28 (m, 1H) 7.37 (m, J=9.29 Hz, 5H). ESI+m/z 304 [M+H]$^+$ Synthesis of Intermediate (XIII) 6-(tert-butyl) 5-methyl (R)-6-azaspiro [2.5]octane-5,6-dicarboxylate With reference to scheme 2 the intermediate (XIII) was prepared.

Intermediate (XII) (4.5 g, 0.015 mol) was dissolved in methanol (200 ml), Pd/C 10% (400 mg) was added, then the suspension was hydrogenated at 3 bars for 2 hours.

After completion, the reaction was filtered through celite bed, washing with methanol (200 ml). The solution was concentrated to 150 ml, cooled to 20° C. then slowly added boc-anhydride (1.2 eq) and stirred for 16 hrs at 25 5° C. After reaction completion, the solvent was evaporated, then the residue purified by column chromatography using silica gel eluting with Hexane/AcOEt 95-5 to 60-40 to afford the title compound as a white solid (3.68 g; 92%).

1H NMR (400 MHz, CHLOROFORM-d) δ=5.03-4.71 (m, 1H), 4.21-3.90 (m, 1H), 3.74 (s, 3H), 3.35-3.04 (m, 1H), 2.27-2.13 (m, 1H), 2.02-1.83 (m, J=4.6, 13.1, 13.1 Hz, 1H), 1.56-1.38 (m, 10H), 0.95-0.72 (m, 1H), 0.43-0.20 (m, 4H). ESI+m/z 270 [M+H]$^+$

Synthesis of Starting Material 1 (SM 1) (R)-6-(tert-butoxycarbonyl)-6 azaspiro [2.5]octane-5-carboxylic acid With reference to scheme 2 the starting material (SM1) was obtained.

Intermediate (XIII) (3.5 g; 0.013 mol) was dissolved in THF (100 ml) and methanol (100 ml), cooled to 0° C., then lithium hydroxide solution (3.0 eq in 50 ml of water) was dropped.

The mixture was stirred at RT for 8 hours. The reaction was cooled to 10° C., quenched with acetic acid to pH 5 (50 ml), concentrated by distilling off MeOH and THF. The concentrated mass was diluted with ice-water and extracted with ethyl acetate (300 ml×2). Combined organic layers were washed with water (200 ml) followed by brine (200 ml). The organic layer was dried over sodium sulphate and concentrated below 50° C. To the residue petroleum ether (300 ml) was added; the solid was filtered off and vacuum dried for 24 hours at 40° C. Yield 3 g (92%)

1H NMR (400 MHz, CHLOROFORM-d) δ=5.11-4.77 (m, 1H), 4.18-3.88 (m, 1H), 3.32-3.09 (m, 1H), 2.32-2.14 (m, 1H), 2.03-1.88 (m, 1H), 1.67-1.55 (m, 1H), 1.50 (br s, 9H), 0.97-0.75 (m, 1H), 0.52-0.26 (m, 4H). ESI+m/z 256 [M+H]$^+$

Example 1b) Synthesis of Starting Material 2 (SM 2)

The starting material 2 (SM 2) was prepared according to known literature procedures (WO2008104055, example 1, step 2).

Example 1c) Synthesis of Intermediate (I) tert-butyl (R)-5-((1-(4-(methoxycarbony)phenyl)cyclopropyl) carbamoyl)-6-azaspiro[2.5]octane-6-carboxylate With reference to scheme 1 the intermediate (I) was obtained.

10 g (0.039 mmol) of starting material 1 were dissolved in DCM (200 ml), HOBt hydrate (1.1 eq) and EDC-HCl (1.1 eq) were added and the mixture was stirred at 20° C. for 30 minutes. Starting material 2 (1.02 eq) was added, then TEA (1.2 eq.); the reaction was left stirring for 6 hours at 30° C., then was quenched with water (100 ml). The organic phase was washed with 5% sodium bicarbonate solution (100 ml), 1M citric acid solution (200 ml), water (200 ml). DCM was evaporated, t-butylmethyl ether (200 ml) was added then the solvent was evaporated again. 400 ml of t-butylmethyl ether was added, the suspension was stirred at 20° C. for 17 hours, then the white solid was filtrated and washed with cool t-butylmethyl ether. The product was dried under vacuum at 50° C. Yield 14.7 g (88%)

1H NMR (400 MHz, CHLOROFORM-d) δ=8.01-7.93 (m, 2H), 7.28 (s, 2H), 6.74 (s, 1H), 4.83 (br s, 1H), 4.21 (br s, 1H), 3.92 (s, 3H), 3.10-2.87 (m, 1H), 2.10-1.99 (m, 1H), 1.97-1.85 (m, 1H), 1.84-1.75 (m, 1H), 1.52 (s, 9H), 1.40 (br s, 4H), 0.88-0.81 (m, 1H), 0.63-0.45 (m, 1H), 0.45-0.29 (m, 2H), 0.28-0.18 (m, 1H).

ESI+m/z 429 $[M+H]^+$

Example 1d): Synthesis of Intermediate (II) methyl (R)-4-(1-(6-azaspiro[2.5]octane-5-carboxamido) cyclopropyl)benzoate With reference to scheme 1 the intermediate (II) was obtained.

Intermediate (I) (14 g; 0.032 mmol) was dissolved in DCM (150 ml), TFA (10 eq.) was added and the solution stirred at 20° C. for 5 hours. Reaction mixture was distilled under vacuum, DCM (100 ml) was added, saturated sodium bicarbonate solution was slowly added at 15-25° C. (300 ml, significant foaming). Organic phase was washed with water (200 ml) and evaporated at reduced pressure. T-butylmethyl ether (200 ml) was added then the solvent was evaporated again. 300 ml of t-butylmethyl ether was added, the suspension was stirred at 20° C. for 17 hours, then the white solid was filtrated and washed with cool t-butylmethyl ether. The product was dried under vacuum at 50° C. Yield 9.65 g (90%)

1H NMR (400 MHz, CHLOROFORM-d) δ=7.96 (d, J=8.3 Hz, 2H), 7.61 (br s, 1H), 7.26 (d, J=8.3 Hz, 2H), 3.91 (s, 3H), 3.46-3.39 (m, 1H), 3.13-3.04 (m, 1H), 2.92-2.82 (m, 1H), 1.87-1.70 (m, 3H), 1.41-1.28 (m, 5H), 1.01-0.93 (m, 1H), 0.46-0.24 (m, 4H). ESI+m/z 329 $[M+H]^+$

Example 1e) Synthesis of Intermediate (III) methyl (R)-4-(1-(6-(4-(trifluoromethyl)benzyl)-6-azaspiro [2.5]octane-5-carboxamido)cyclopropyl)benzoate With reference to scheme 1 the intermediate (III) was obtained.

Intermediate (II) (9.5 g, 0.029 mmol) was dissolved in dry THF (150 ml), then $Cs_2CO_3$ (2 eq) and 4-(trifluoromethyl) benzyl bromide (1.2 eq dissolved in 75 ml of THF) were added. Reaction mixture was stirred at 25° C. for 8 hours, then 350 ml of DCM and 350 ml of water were added. Organic phase was washed with water (150 ml) and brine (250 ml) and evaporated at reduced pressure. n-heptane (1500 ml) was added then the solvent was evaporated again. 150 ml of n-heptane was added, the suspension was stirred at 20° C. for 4 hours, then the white solid was filtrated and washed with n-heptane. The product was dried under vacuum at 50° C. Yield 12.95 g (92%)

1H NMR (400 MHz, CHLOROFORM-d) δ=7.96-7.89 (m, 2H), 7.66-7.61 (m, 2H), 7.47-7.40 (m, 3H), 7.27-7.21 (m, J=8.8 Hz, 2H), 3.90 (s, 3H), 3.84 (d, J=14.7 Hz, 1H), 3.35 (d, J=14.7 Hz, 1H), 3.05 (dd, J=3.9, 10.3 Hz, 1H), 2.93-2.86 (m, 1H), 2.31-2.22 (m, 1H), 2.07-1.98 (m, 1H), 1.88-1.78 (m, 1H), 1.45-1.27 (m, 4H), 1.17-1.08 (m, 1H), 1.01-0.94 (m, 1H), 0.50-0.36 (m, 3H), 0.33-0.26 (m, 1H). ESI+m/z 487 $[M+H]^+$

Example 1f): Synthesis of Compound of Formula (IV), i.e. (R)-4-(1-(6-(4-(trifluoromethyl)benzyl)-6-azaspiro[2.5]octane-5-carboxamido)cyclopropyl) benzoic acid With reference to scheme 1 the compound (IV) in the form of acid was obtained.

Intermediate (III) (12 g, 0.024 mmol) was dissolved in THF (70 ml), then NaOH 2N (4 eq) was added. The reaction was left stirring at 5° C. for 5 hours, then water (200 ml) was added and organics evaporated. 200 ml of dichloromethane was added and pH of the mixture was adjusted to 4.5-5.0 with acetic acid; the organic phase was washed with water and brine (200 ml×3), evaporated to obtain the title compound (9.9 g; 85%)

$^1$H NMR (400 MHz, DMSO-d6) δ ppm 12.72 (1H, s), 8.73 (1H, s), 7.78 (2H, d, J=8.6 Hz), 7.69 (2H, d, J=8.3 Hz), 7.64 (2H, d, J=8.3 Hz), 7.20 (2H, d, J=8.6 Hz), 3.79 (2H, d, J=13.9 Hz), 3.28 (1H, d, J=13.9 Hz), 2.93 (1H, dd, J=3.1; 10.3 Hz), 2.73 (1H, m), 2.08 (2H, m), 1.78 (1H, m), 1.10-1.31 (5H, m), 0.87 (1H, m), 0.32 (4H, m). ESI+m/z 473 $[M+H]^+$.

Example 1q) Preparation of Sodium Salt of R)-4-(1-(6-(4-(trifluoromethyl)benzyl)-6-azaspiro[2.5] octane-5-carboxamido)cyclopropyl)benzoic acid A sodium salt was prepared by adding NaOH in EtOH after solubilization of intermediate (IV) in a solvent.

A synthesis protocol for sodium (R)-4-(1-(6-(4-(trifluoromethyl)benzyl)-6-azaspiro [2.5]octane-5-carboxamido) cyclopropyl)benzoate (Form A) was established as reported in the following.

Compound (IV) (50 g, 0.1 mol) was dissolved in n-propanol (400 ml), then a cooled solution of NaOH (1.02 eq) in EtOH (70 ml) was added. The suspension was stirred at 20-24° C. for 18-20 hours, then filtered, washed with precooled n-propanol (100 ml) and dried at 70° C. for 24 hours. Yield 43 g white solid (87%)

$^1$H NMR (400 MHz, DMSO-d6) δ ppm 8.68 (1H, s), 7.73 (2H, d, J=8.3 Hz), 7.69 (2 H, d, J=8.3 Hz), 7.64 (2H, d, J=8.3 Hz), 7.02 (2H, d, J=8.3 Hz), 3.81 (2H, d, J=13.9 Hz), 3.26 (1H, d, J=13.9 Hz), 2.92 (1H, dd, J=3.1; 10.5 Hz), 2.72 (1H, m), 2.07 (2H, m), 1.78 (1H, m), 1.16 (4H, m), 1.09 (1H, m), 0.85 (1H, m), 0.30 (4H, m). ESI+m/z 473 $[M+H]^+$ Characterization of sodium (R)-4-(1-(6-(4-(trifluoromethyl)benzyl)-6-azaspiro [2.5]octane-5-carboxamido)cyclopropyl)benzoate (Form A).

Solid State NMR Solid-state NMR measurements were run on a Bruker AVANCE II 400 instrument operating at 400.23 and 100.65 MHz for 1H and 13C, respectively. $^{13}$C CPMAS spectra were recorded at room temperature at the spinning speed of 12 kHz. Cylindrical 4 mm o.d. zirconia rotors with sample volume of 80 μL were employed. For CPMAS experiments, a ramp cross polarization pulse sequence was used with a contact time of 3 ms, a 1H 90° pulse of 4.0 μs, recycle delays of 5-10 s, and 2000-4000 transients. The two pulse phase modulation decoupling scheme was used with a frequency field of 75 KHz $^{13}$C chemical shifts (ppm)

δ=177.1; 144.8; 143.1; 136.9; 129.3; 124.9; 71.4; 65.5; 61.3; 57.3; 51.2; 39.0; 35.1; 23.2; 18.0; 14.9; 12.6

XRPD

XRPD measurements were run on X-ray powder diffractometer PANalytical X'pert Pro with Bragg-Brentano geometry and equipped with:
 a) Detector X'Celerator
 b) Multisampler
 c) Spinner
 d) Ceramic X-ray tube Cu LFF ($\lambda_1$=1.54051 A; $\lambda_2$=1.54430 A) Range 4-40° 2θ

| Characteristic peaks (°2Θ) |
| --- |
| 4.3 ± 0.2°2Θ |
| 5.0 ± 0.2°2Θ |
| 5.8 ± 0.2°2Θ |
| 6.4 ± 0.2°2Θ |
| 7.1 ± 0.2°2Θ |
| 8.3 ± 0.2°2Θ |
| 8.7 ± 0.2°2Θ |
| 12.8 ± 0.2°2Θ |
| 15.3 ± 0.2°2Θ |
| 15.9 ± 0.2°2Θ |

DSC

The thermogram was acquired using a Perkin-Elmer DSC8000, the scan rate was 10° C./min from 30° C. to 300° C. The thermogram is reported in FIG. 1.

Detected peak: T onset=252.64° C., ΔH=56.11 J/g

IR

Figure 2:
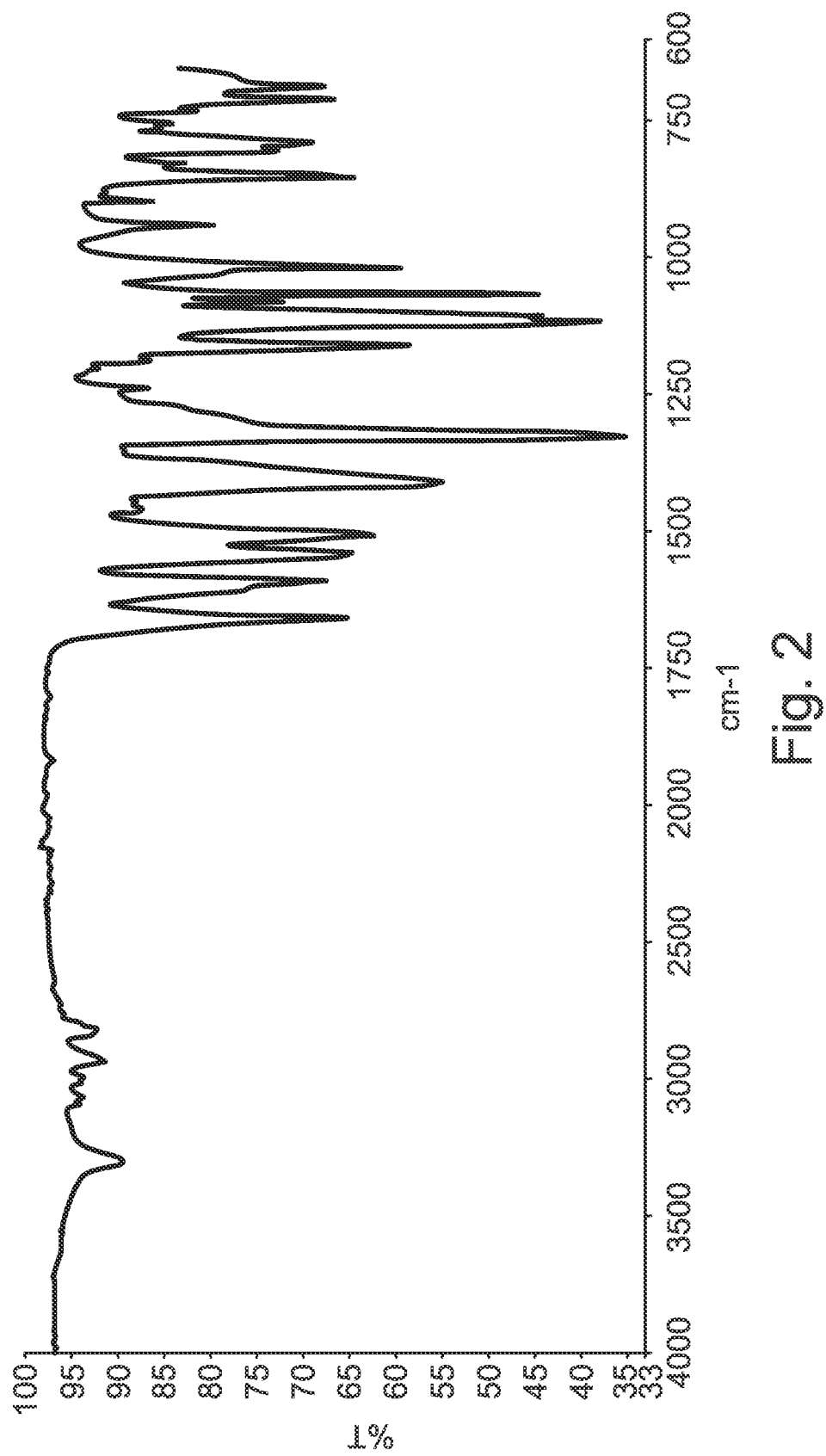

The IR spectrum was recorded on a Perkin Elmer Spectrum 100 FT/IR instrument between 4000 and 650 cm$^{-1}$ by means of the ATR (Attenuated Total Reflectance) mode. The IR spectrum is reported in FIG. 2. The main absorption frequencies are reported in the following table:

| Band (cm$^{-1}$) |
| --- |
| 3301 |
| 2996 |
| 2938-2821 |
| 1659 |
| 1590 |
| 1540 |
| 1411 |

Example 2: Effect of the Crystalline Form A of (R)-4-(1-(6-(4-(trifluoromethyl)benzyl)-6-azaspiro[2.5]octane-5-carboxamido)cyclopropyl)benzoic acid Sodium Salt in Pathological Heterotopic Ossification Induced by Autoimmunity in Rats (CIA Model)

Collagen Induce Arthritis (CIA) in rats is among the most common models used to mimic human arthritis and especially Rheumatoid Arthritis (RA). In general the joint response seen in this model is quite similar to that observed in human pathology, in terms of inflammation, bone erosion and cartilage damage. Nevertheless, this model differs from Rheumatoid Arthritis, since it is endowed with a consistent periosteal woven bone formation (immature bone) that is not a usual feature of human RA (maybe, less than 10% of patients have this type of bone reaction). On the contrary, this disordered apposition of new bone is the distinctive feature of heterotopic ossification. Therefore, this model was used to study the effect of the compound of the invention in Pathological heretopic osteogenesis.

Male Lewis rats were immunized by intradermal injection at the base of the tail with an emulsion containing 150 µg of bovine collagen type II (bCII) in complete Freund's adjuvant (CFA) or received an injection with incomplete Freund's adjuvant (sham group). Three weeks after the first immunisation, animals were boosted with the same procedure. Three days after booster injection, arthritis had developed in all animals but the sham group. The administration of the compound (1) Form A started at this time point and lasted for 14 days (once a day, unless otherwise indicated).

The paws were fixed in 10% neutral buffered formalin (Bio-Optica, Milan, Italy) and subsequently decalcified in EDTA for 4 weeks. Samples were dehydrated in an ethanol series and embedded in paraffin. At least three non-consecutive sections for each paw were blindly scored at the level of the tarsus, metatarsus and calcaneus for the following histological features of woven bone. Two independent pathologists performed histopathology on blinded slides. The data of right and left hind limbs were summed for each rat.

The results are reported in FIGS. 3-6.

Figure 3:
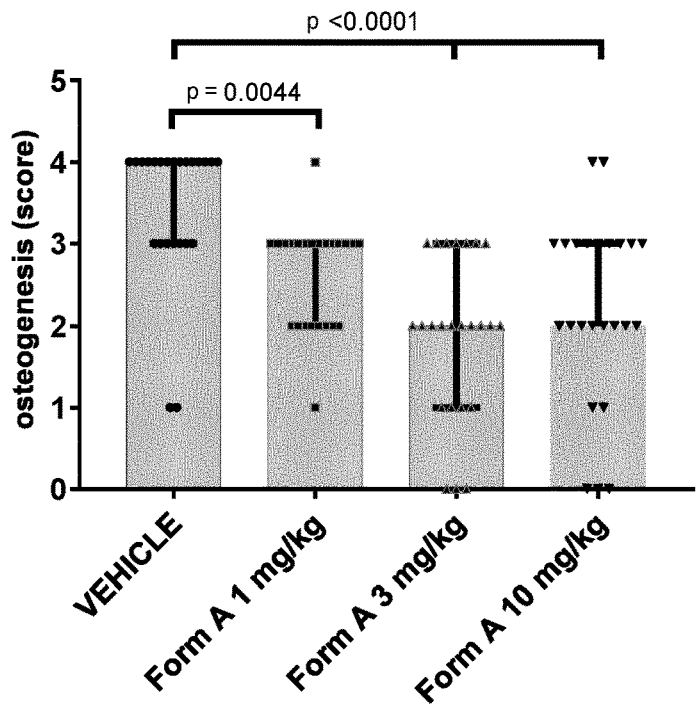
FIG. 3 reports the results of the form A of the sodium salt of (R)-4-(1-(6-(4-(trifluoromethyl)benzyl)-6-azaspiro[2.5]octane-5-carboxamido)cyclopropyl)benzoic acid reached in the arthritis model (CIA-induced). The data were expressed as the median (boxed area), 95% interquartile range (whiskers), and individual data (symbols) of the histological scores for heterotopic bone formation (osteogenesis) given by two pathologists unaware of the treatment groups on a following scale: 0=absent; 1=mild/focal; 2=moderate/multifocal; 3=severe/multifocal to diffuse. Since arthritis was bilateral, the scores for each rat was the sum of the two leg scores. The compound was able to counteract bony spur formation in a dose-dependent fashion (doses in mg/kg). The activity was maximal at the optimal dose of 10 mg/kg.

In FIG. 3 the dose-response curve for the compound of the invention is reported. the compound was administered once a day for 14 days on the site where the pathological bone formation was expected as induced in the CIA model in rats. The dose were 1 mg/Kg, 3 mg/kg and 10 mg/kg. The data were expressed as the median (boxed area), 95% interquartile range (whiskers), and individual data (symbols) of the histological scores for heterotopic bone formation (osteogenesis) given by two pathologists unaware of the treatment groups on a following scale: 0=absent; 1=mild/focal; 2=moderate/multifocal; 3=severe/multifocal to diffuse. Since arthritis was bilateral, the scores for each rat was the sum of the two leg scores. As it can been in FIG. 3, the compound of the invention was capable to counteract the heterotopic bone formation. The compound reached the maximal activity at 10 mg/kg.

Figure 4:
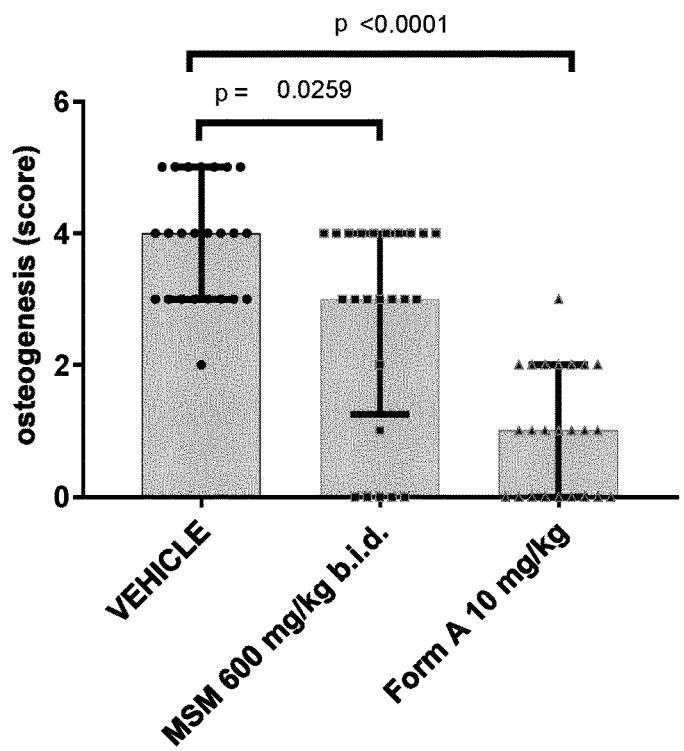
FIG. 4 reports, in the CIA model, the activity of the form A of the sodium salt of (R)-4-(1-(6-(4-(trifluoromethyl)benzyl)-6-azaspiro[2.5]octane-5-carboxamido)-cyclopropyl)benzoic acid was evaluated in the osteogenesis and the compound resulted to have consistent and higher activity than that of anti-inflammatory products. The data were expressed as the median histological scores for heterotopic bone formation (osteogenesis) as described for FIG. 3. In this case the form A of the sodium salt of (R)-4-(1-(6-(4-(trifluoromethyl)benzyl)-6-azaspiro[2.5]octane-5-carboxamido)cyclopropyl)benzoic acid at 10 mg/kg daily, was compared with Methylsulfonylmethane (MSM), a naturally occurring organosulfur compound that has gained popularity as an anti-inflammatory agent (600 mg/kg b.id.).

In FIG. 4 the effect of the Form A of the sodium salt of (R)-4-(1-(6-(4-(trifluoromethyl)benzyl)-6-azaspiro[2.5]octane-5-carboxamido)cyclopropyl)benzoic acid at 10 mg/kg once a day in the CIA model was tested for osteogenesis with respect to the anti-inflammatory product Methylsulfonylmethane (MSM), a naturally occurring organosulfur compound that has gained popularity as an anti-inflammatory agent. The latter was administered once a day at the dose of 600 mg/Kg. The data were expressed as the median histological scores for heterotopic bone formation (osteogenesis) as described for FIG. 3. As it can be seen from FIG. 4 the activity of the compound of the invention was greatly superior than that Methylsulfonylmethane (MSM), even if the latter was administered at a daily dose more than 100-fold higher (600 mg/kg b.i.d.).

Figure 5:
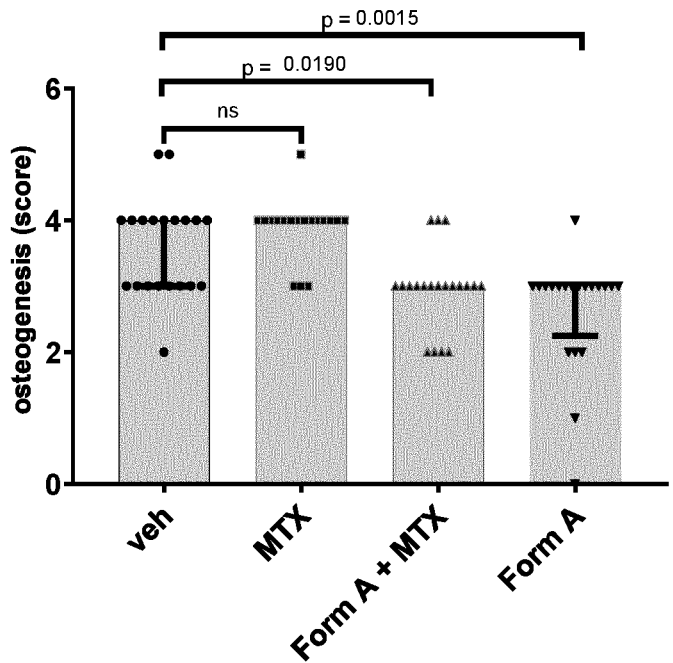
FIG. 5 reports the efficacy of the form A of the sodium salt of (R)-4-(1-(6-(4-(trifluoromethyl)benzyl)-6-azaspiro[2.5]octane-5-carboxamido)cyclopropyl)benzoic acid against heretotopic ossification in the CIA model at the lowest effective dose (1 mg/kg), evaluated with respect to DMARD drug methotrexate (0.5 mg/kg). The data were expressed as the median histological scores for heterotopic bone formation (osteogenesis) as described for FIG. 3. The activity resulted to be higher than the comparative compound and resulted not hindered by the combination with this drug.

In FIG. 5 results are reported about the efficacy of the Form A of the sodium salt of (R)-4-(1-(6-(4-(trifluoromethyl)benzyl)-6-azaspiro[2.5]octane-5-carboxamido)cyclopropyl)benzoic acid against heterotopic ossification in the CIA model at the lowest effective dose (1 mg/kg). The evaluation was carried out with respect to DMARD drug methotrexate (0.5 mg/kg, every other day), the first line drug for autoimmune disorders. The data were expressed as the median histological scores for heterotopic bone formation (osteogenesis) as described for FIG. 3. The activity resulted to be higher than the comparative compound, and resulted not hindered by the combination with this drug.

Figure 6:
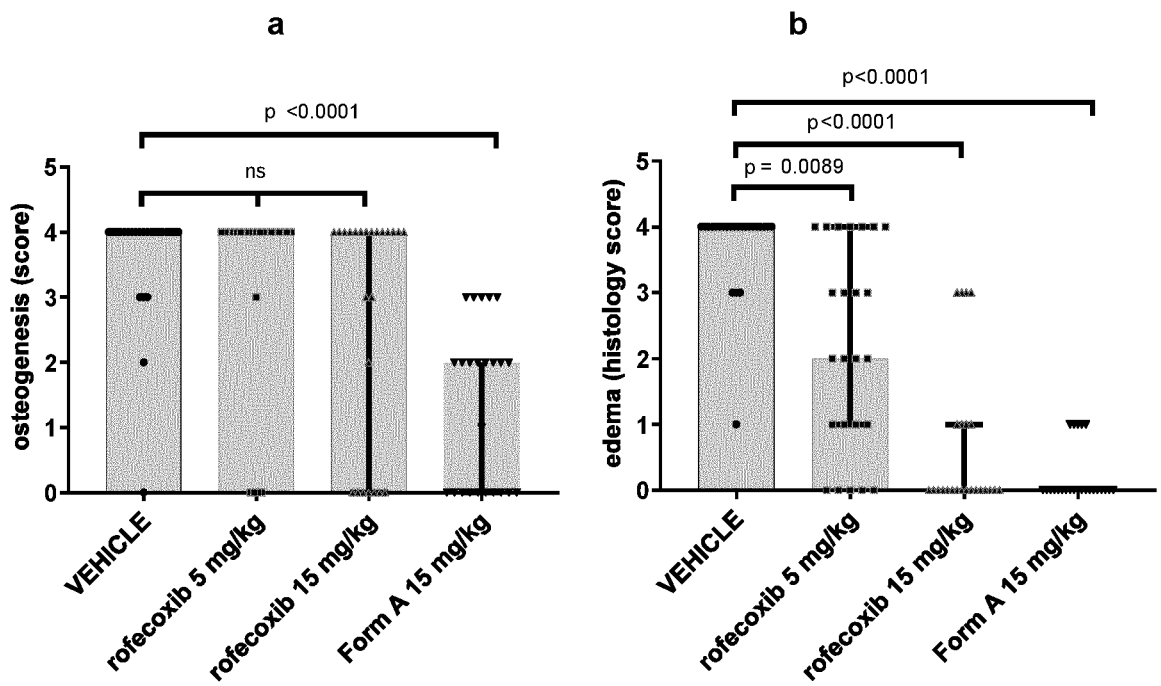
FIG. 6 (a and b): the form A of the sodium salt of (R)-4-(1-(6-(4-(trifluoromethyl)benzyl)-6-azaspiro[2.5]octane-5-carboxamido)cyclopropyl)benzoic acid (15 mg/kg) resulted surprisingly superior to an identical dose of the potent COX2 inhibitor rofecoxib in controlling pathological heretotopic ossification in CIA (a). The data were expressed as the median histological scores for heterotopic bone formation (osteogenesis) as described for FIG. 3. Even if the two products were equally effective in controlling the inflammatory response (edema, b). As for osteogenesis, the data reported in this graph were the median (boxed area), 95% interquartile range (whiskers), and individual data (symbols) of the histological scores for synovial hyperplasia (oedema) given by two pathologists unaware of the treatment groups on a following scale: 0=normal: 1-2 layers of synovial lining cells, 1=mild: focal to multifocal 3-4 layers of synovial lining cells and/or mild proliferation of subsynovial tissue, 2=moderate: focal to mutlitfocal >4-6 layers of synovial lining cells and/or moderate proliferation of subsynovial tissue, 3=severe: multifocal to diffuse >6-8 layers of synovial lining cells and/or severe proliferation of subsynovial tissue. Since arthritis was bilateral, the scores for each rat was the sum of the two leg scores.
Figure 7:
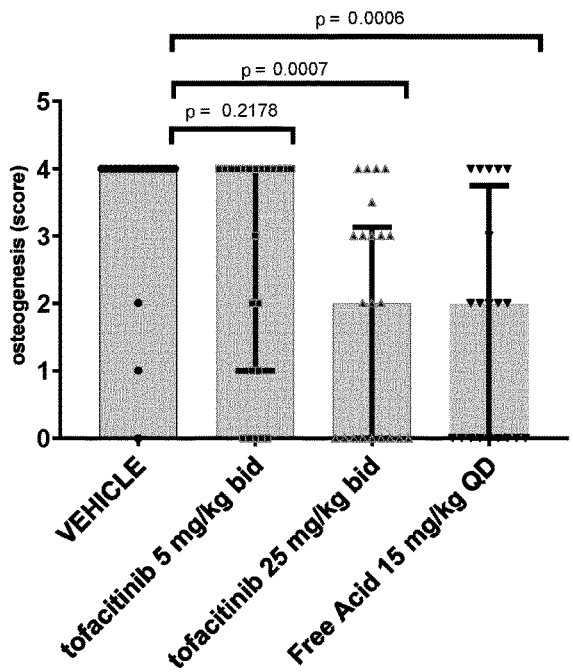
FIG. 7 shows that the free acid form, i.e. (R)-4-(1-(6-(4-(trifluoromethyl)benzyl)-6-azaspiro[2.5]octane-5-carboxamido)cyclopropyl)benzoic acid (15 mg/kg), was able to control pathological heretotopic ossification in CIA, being more potent than the powerful JAK kinase inhibitor tofacitinib, a product marketed for human RA. The data were expressed as the median histological scores for heterotopic bone formation (osteogenesis) as described for FIG. 3.

The results reported in FIG. 6 showed that, surprisingly, the activity of the compound of the invention on pathological heterotopic formation is somehow unrelated to its anti-inflammatory activity; specifically, Form A of (R)-4-(1-(6-(4-(trifluoromethyl)benzyl)-6-azaspiro[2.5]octane-5-carboxamido)cyclopropyl)benzoic acid sodium salt (15 mg/kg) and the potent COX2 inhibitor rofecoxib were administered at an identical dose. The activity of the compound of the invention resulted surprisingly superior to the identical dose of COX2 inhibitor in preventing the pathological heterotopic ossification in CIA (Figure a). The data were expressed as the median histological scores for heterotopic bone formation (osteogenesis) as described for FIG. 3. This was surprising considering that for the control of the inflammatory response the two products were equally effective (inflammatory parameter: edema, FIG. 6b). As for osteogenesis, the data reported in this graph were the median (boxed area), 95% interquartile range (whiskers), and individual data (symbols) of the histological scores for synovial hyperplasia (oedema) given by two pathologists unaware of the treatment groups on a following scale: 0=normal: 1-2 layers of synovial lining cells, 1=mild: focal to multifocal 3-4 layers of synovial lining cells and/or mild proliferation of subsynovial tissue, 2=moderate: focal to mutlitfocal >4-6 layers of synovial lining cells and/or moderate proliferation of subsynovial tissue, 3=severe: multifocal to diffuse >6-8 layers of synovial lining cells and/or severe proliferation of subsynovial tissue. Since arthritis was bilateral, the scores for each rat is the sum of the two leg scores. This underline a preferential and surprising effect of (R)-4-(1-(6-(4-(trifluoromethyl)benzyl)-6-azaspiro[2.5]octane-5-carboxamido)cyclopropyl)benzoic acid on the heterotopic bone formation, that shared by powerful anti-inflammatory agents.

From the figures above in the rat CIA model it was possible to show a surprising activity of the Form A of the sodium salt of (R)-4-(1-(6-(4-(trifluoromethyl)benzyl)-6-azaspiro[2.5]octane-5-carboxamido)cyclopropyl)benzoic acid against heterotopic osteogenesis triggered by an autoimmune response. Furthermore, (R)-4-(1-(6-(4-(trifluoromethyl)benzyl)-6-azaspiro[2.5]octane-5-carboxamido)cyclopropyl)benzoic acid was surprisingly more effective than drugs usually used to control inflammation.

Example 3: Effect the Free Acid Form of (R)-4-(1-(6-(4-(trifluoromethyl)benzyl)-6-azaspiro[2.5]octane-5-carboxamido)cyclopropyl)benzoic acid in Pathological Heterotopic Ossification Induced by Autoimmunity in Rats (CIA Model)

The free acid form has been assayed in the rat CIA model as already described for its sodium salt (Form A). In this experiment the compound, given orally at the dose of 15 mg/kg once a day, has been compared with the powerful JAK inhibitor tofacitinib, already marketed for human rheumatoid arthritis.

The method used is the same as described in Example 2.

Due to its short half-life, tofacitinib was given twice a day (5 or 25 mg/kg b.i.d.). The data shown in FIG. 6 were expressed as the median histological scores for heterotopic bone formation (osteogenesis) as described for FIG. 3.

The potency of the compound of the invention was superior than that of tofacitinib. The latter reached the same effect in controlling osteogenesis only when given at a daily dose more than three times higher than that of the compound of the invention as a free acid (i.e. 25 mg/kg b.i.d, vs. 15 mg/kg QD, respectively).

Comparing the data of Examples 2 and 3 it is evident that their effects on heterothopic bone formation are similar.

Example 4: Effect of the Form A of the Sodium Salt of (R)-4-(1-(6-(4-(trifluoromethyl)benzyl)-6-azaspiro[2.5]octane-5-carboxamido)cyclopropyl) benzoic acid on Bone Structure Altered by Autoimmunity in Rats (CIA Model) Micro-CT Study Male Lewis rats were immunized and treated exactly as described in example 2.

Specifically, the animals were divided in four groups: controls, vehicle treated CIA rat, and two groups administered with a dose of 10 mg/kg and 30 mg/kg, respectively, of the compound of the invention.

After 14 days of treatment, bone samples corresponding to hind limbs (left and right) of arthritic rats or sham ones were sent for micro-CT analysis to Atlantic Bone Screen (ABS, 3 rue Aronnax, 44800 SAINT-HERBLAIN France). Bone samples were sent to ABS facilities after they have been removed from soft tissue and fixed in formalin solution within a maximum of 1 week.

40 samples were analyses blindly. Then, the unmask data were analyzed to compare the different groups:

| CIA | Arthritic animals | 5 left + 5 right |
|---|---|---|
| Low dose | Arthritic animals treated at 10 mg/kg | 5 left + 5 right |
| High dose | Arthritic animals treated at 30 mg/kg | 5 left + 5 right |
| Controls | Sham operated animals | 5 left + 5 right |

Analyses of calcaneus and knee density and microarchitectural characteristics were performed using the high-resolution X-ray micro-CT. Micro-CT parameters were: tube voltage, 50 kV; isotropic voxel size, 18 µm; rotation, 0.50; 2 frames averaging and aluminum filter (0.5 mm). Image data set was thus reconstructed as a series of 2D binarized cross-sections (reconstruction step) which are then used for the calculations and image analyzes. To quantitatively compare the four groups, the hind paw calcaneus, knee (proximal tibial and distal femoral epiphysis) and proximal tibial metaphysis were identified as the anatomical sites for micro-CT analysis. The bone mineral density (BMD), bone volume ratio (BV/TV), bone surface (BS) and bone surface-volume ratio (BS/BV) was calculated while including calcaneus, proximal tibial and distal femoral epiphysis (cortical bone, cancellous bone and potential osteophytes).

Micro-CT analysis on bone structure allowed precisely evaluating the sites of pathological new bone apposition.

Figure 8:
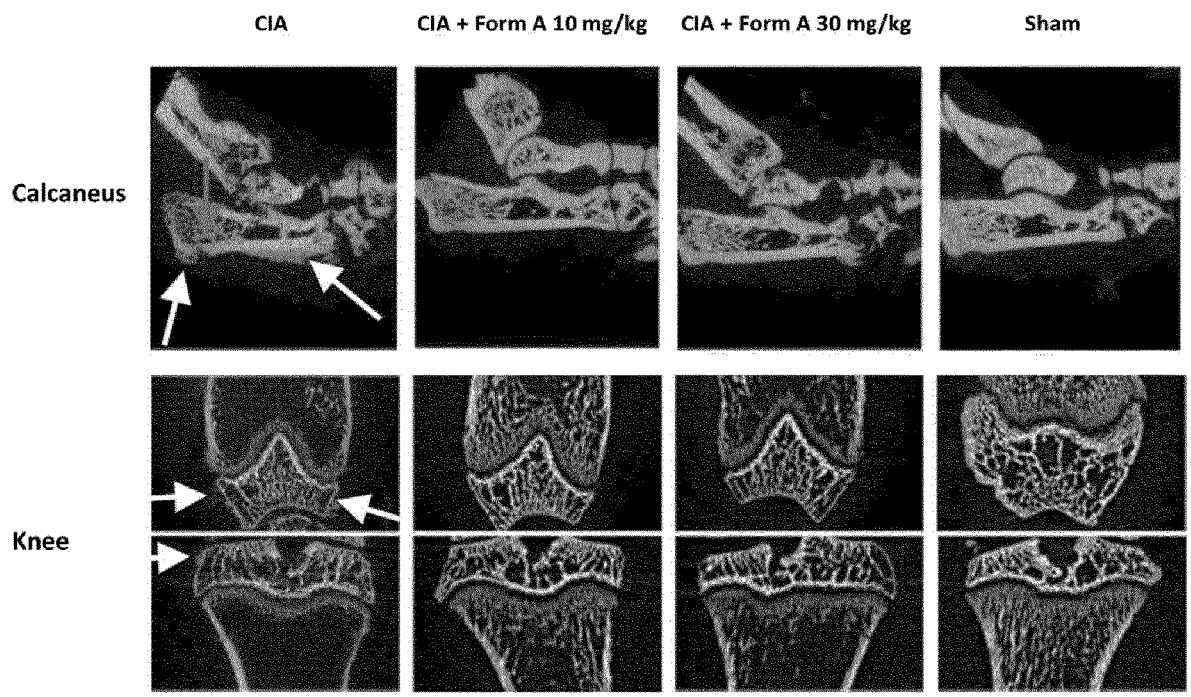
FIG. 8 reports Micro-Computerized Tomography (micro-CT) representative sagittal images of calcaneus and longitudinal images of knee. These images demonstrated that in the CIA model in rats the form A of the sodium salt of (R)-4-(1-(6-(4-(trifluoromethyl)benzyl)-6-azaspiro[2.5]octane-5-carboxamido)cyclopropyl)-benzoic acid administered at 10 and 30 mg/kg was capable to counteract osteophyte formation. The activity was already maximal at the optimal dose of 10 mg/kg and was maintained using a higher dose of 30 mg/kg. Osteophytes were indicated by the white arrows.

FIG. 8 shows very clearly that arthritic animals had potential osteophytes at heterotopic sites (white arrows) both in the knees and, especially in the hind paw calcaneus. In this site the location of the potential osteophytes seemed to correspond to the insertion of the long plantar ligament (enthesis).

Under treatment with compound, the osteophytes disappeared at both site (calcaneus and knee) whatever the dose. These images demonstrated that in the CIA model in rats the Form A of the sodium salt of (R)-4-(1-(6-(4-(trifluoromethyl)benzyl)-6-azaspiro[2.5]octane-5-carboxamido)cyclopropyl)benzoic acid administered at 10 and 30 mg/kg was capable to counteract osteophyte formation. The activity was already maximal at the optimal dose of 10 mg/kg and was maintained using a higher dose of 30 mg/kg This test confirmed that the compound of the invention was able to counteract pathological bone formation at heterotopic sites.

Example 5: Effect of (R)-4-(1-(6-(4-(trifluoromethyl)benzyl)-6-azaspiro[2.5]octane-5-carboxamido)cyclopropyl)benzoic acid in Pathological Heterotopic Ossification Induced by Autoimmunity in Mice (CIA Model)

Figure 9:
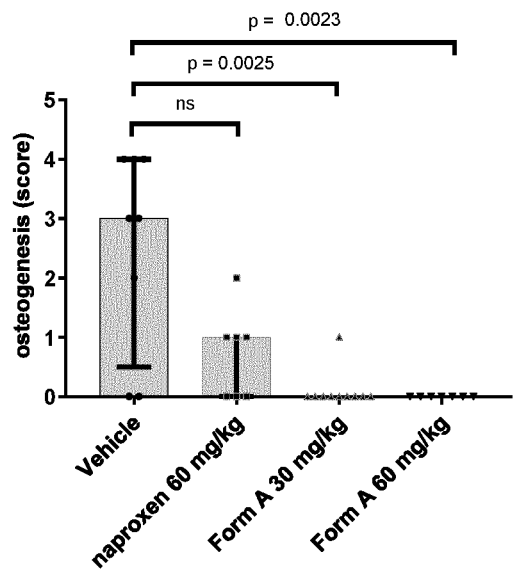
FIG. 9 shows that the effect of the form A of the sodium salt of (R)-4-(1-(6-(4-(trifluoromethyl)benzyl)-6-azaspiro[2.5]octane-5-carboxamido)cyclopropyl)benzoic acid against heterotopic ossification was maintained also when the CIA model was performed in mice. The data were expressed as the median histological scores for heterotopic bone formation (osteogenesis) as described for FIG. 3. Even in this case, a clear superiority towards the classical NSAID naproxen was observed.

CIA in mice is another very popular translational model to mimic human arthritis. Also in this paradigm it is possible to observe a pathological and consistent periosteal woven bone formation (immature bone). This model was used to confirm the effect of the compound of the invention against heterotopic osteogenesis. Male DBA/1 mice were immunized by intradermal injection at the base of the tail with an emulsion of 200 μg of bCII in CFA containing 3 mg/ml *Mycobacterium tuberculosis*. Non-immunized mice served as the negative control of disease. Animals were monitored by visual inspection for appearance of peripheral edema. Arthritis onset occurred starting from day 20 after immunization. Upon onset, animals were recruited and randomized. Recruitment was given a cut-off at day 40. Upon recruitment, arthritis clinical score was assigned, and edema was measured via caliper. Mice were randomized into the following groups: vehicle, 30 mg/kg the form A of the sodium salt of (R)-4-(1-(6-(4-(trifluoromethyl)benzyl)-6-azaspiro[2.5]octane-5-carboxamido)cyclopropyl)benzoic acid, 60 mg/kg the form A of the sodium salt of (R)-4-(1-(6-(4-(trifluoromethyl)benzyl)-6-azaspiro[2.5]octane-5-carboxamido)cyclopropyl)benzoic acid and 60 mg/kg naproxen. Animals received the test drugs once daily for 10 days. Histology was performed as described for rats. FIG. 9 showed that the compound of the invention at the lowest tested dose (30 mg/kg, roughly corresponding to 15 mg/kg in rats) was already maximally active against pathological bone formation in this model, indeed this feature was completely abrogated in almost all animals. On the contrary the potent non-Steroidal-Analgesic-Drug (NSAID) naproxen, even if administered at a double dose was not able to significantly affect new heterotopic bone formation. This confirms that the effect of the compound of the invention is somehow unrelated to its general anti-inflammatory effect.

Also in this relevant animal model the compound of the invention confirmed its surprising efficacy in counteracting pathological bone formation. This effect is unrelated to its ability to abrogate the general inflammatory response of the organism.

Example 6: Effect of the Form A of the Sodium Salt of (R)-4-(1-(6-(4-(trifluoromethyl)benzyl)-6-azaspiro[2.5]octane-5-carboxamido)cyclopropyl) Benzoic Acid in Pathological Heterotopic Ossification Induced by a Tcell Driven Patholoqy in Rats (AIA Model)

Adjuvant Induced Arthritis (AIA) in rats is a widely studied and accepted animal model of inflammatory arthritis driven by Tcells. In experimental autoimmune diseases, CFA mediated activation of the innate immune compartment is important not only by regulating the early induction phase, but also by providing a surplus of effector and regulator cells in the late phase. Also in this model it was possible to appreciate a relevant pathological apposition of new bone. This paradigm was used as a third model to further confirm the effect of the compound of the invention as an effective inhibitor of pathological heterotopic ossification.

Sprague Dawley male rats (Charles River) were immunized by intradermal injection at the base of the tail with 150 μl of complete Freund's adjuvant (CFA) containing 10 mg/ml of heat killed *Mycobacterium tuberculosis* (Chondrex code 7027) or with incomplete Freund's adjuvant (IFA) (sham n=10). Ten days after immunization arthritis developed in all animals, but not in the sham-group; edema and clinical scores were assessed and the animals were then randomized and assigned to treatment groups (n=9-12) as follows: vehicle, the compound of the invention 10 mg/kg or 30 mg/kg. The compound of the invention was administered orally once a day for 15 days. Clinical score and edema measurements were performed as follows: before immunization, at the onset of arthritis before drug treatment, on day 7 and 14, 1 hour after drug administration (considering day 0 as the first treatment day). Histological evaluation was carried out as described in rat CIA.

Figure 10:
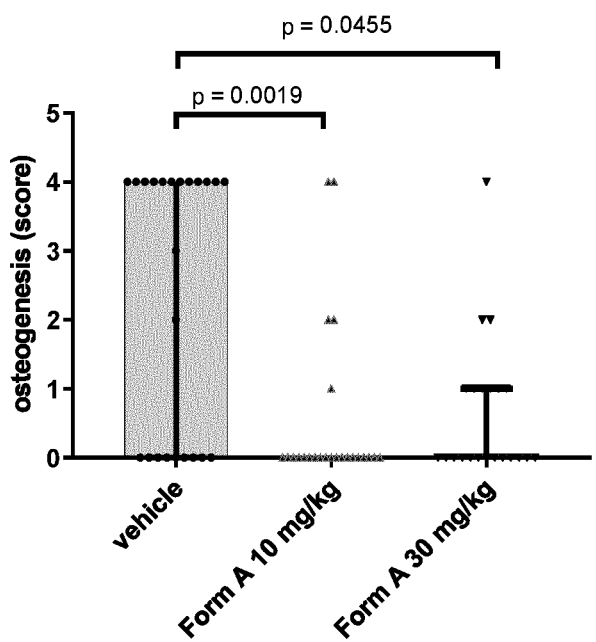
FIG. 10 shows that in another paradigm of Tcell-driven arthritis in rats, the Adjuvant Induced Arthritis (AIA) in rats confirmed that 10 mg/kg was the optimal dose for controlling pathological periosteal osteogenesis. The data were expressed as the median histological scores for heterotopic bone formation (osteogenesis) as described for FIG. 3.

The results are reported in FIG. 10. The compound administered at 10 mg/kg once a day, completely abrogated the pathological bone apposition in almost all animals.

This surprising result, together with previously described models in the above examples, confirmed that the compound of the invention was peculiarly active against Pathological periosteal osteogenesis.

Example 7: Effect of the Form A of the Sodium Salt of (R)-4-(1-(6-(4-(trifluoromethyl)benzyl)-6-azaspiro[2.5]octane-5-carboxamido)cyclopropyl) Benzoic Acid in Pathological Osteoblast Proliferation (Human Primary Cells)

This model has been performed to understand if the compound of the invention could correct the pathological hyperproliferation of osteoblasts taken from patients suffering from degenerative pathologies eventually resulting in a total joint replacement surgical procedure.

Trabecular bone of the tibial plateau was obtained from patients with Osteoarthritis (OA) undergoing joint replacement surgery. This material was purchased from Alphenyx (Marseille, France). Overlaying cartilage and soft connective tissue were first removed from tibial plateaus, and the trabecular bone tissue was dissected away from the subchondral bone plate. The tissue was placed in sterile petri dish containing 5-10 ml of PBS with AASS (Antibiotic Antimycotic Solution (100×), stabilized with 10,000 units penicillin, 10 mg streptomycin and 25 μg amphotericin B). Using bone cutters and scissors the bone was cut into 2-4 mm fragments. These were carefully washed by transfer into a 50 ml Falcon with 10-15 ml PBS with AASS. Vortexed for 3-5 s, bone fragments were thereafter allowed to settle down for 30 s. The supernatant was decanted off in order to remove haematopoietic marrow, marrow fat and dislodged cells. This process was repeated at least six times or until no remaining haematopoietic marrow and marrow fat was visible and the bone fragments assumed a white ivory-like appearance. The fragments were then incubated in 1% trypsin for 10 min at 37° C. Trypsin solution was then discarded and the fragment washed in DMEM, and then in PBS. The fragments were then incubated in 0.2% collagenase solution for 30 min at 37° C. The collagenase digest was then discarded and washed with DMEM. These fragments as explants were cultured at a density of 0.2-0.5 g tissue per 100 mm diameter in a petri dish 10 ml of DMEM at 37° C. with 5% $CO_2$. The cultures were left undisturbed for 7 days to ensure the outgrowing cells to adhere to the tissue culture plastic. The first cells were observed after 7-10 days of culture. The medium was changed every 7 days for 6-8 weeks. After this period the cells were detached and plated 5.000 cells/well in a 96× culture dish with DMEM 10%+AASS for 24 h. Thereafter the cells were treated with inflammatory cytokines and the compound of the invention for 1, 6, 9 and 14 days with a medium change (and new treatment) every ⅔ days. The cell proliferation was analysed in a time course protocol by MTT assay. At the end of the incubation time, the medium was removed and was substituted with a mixture 10:1 of DMEM GlutaMAX|10%: MTT (2 mg/ml) for 1 h at 37° C. in the cell incubator. MTT was a tetrazolium salt especially useful to quantify living metabolically active cells. Its metabolism by mitochondrial dehydrogenases yielded a formazan dye (salt). After this incubation the supernatant was removed and the precipitated salt was dissolved with 100 µl of DMSO. The plate was then read at λ=540 nm. In every experiments 100 µl of DMSO alone (without cells) were used as a blank that was subtracted from each sample.

Figure 11:
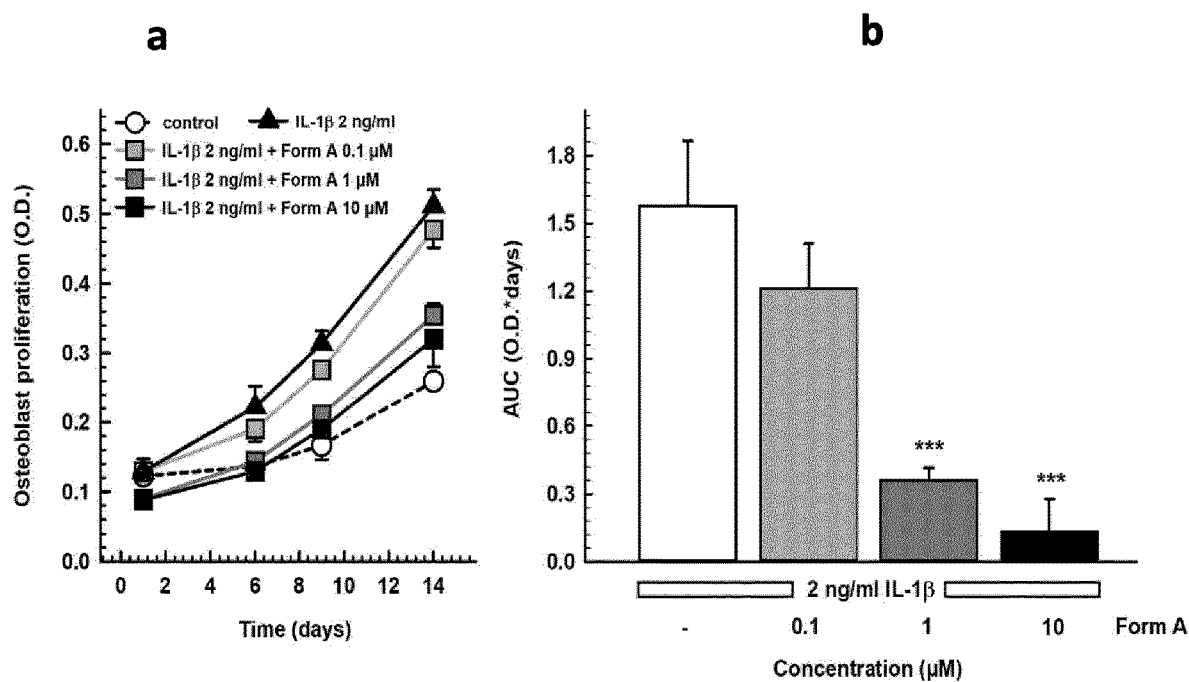
FIG. 11 shows the effect of the form A of the sodium salt of (R)-4-(1-(6-(4-(trifluoromethyl)benzyl)-6-azaspiro[2.5]octane-5-carboxamido)cyclopropyl)benzoic acid on human pathological osteoblast proliferation induced by IL-1β 2 ng/ml. Human osteoblasts were purified from material obtained from patients undergoing knee replacement. Trabecular bone cells were isolated by spontaneous outgrowth culture methods. Purified osteoblasts were stimulated with IL-1β 2 ng/ml. Osteoblast proliferation was studied by MTT analysis in time course experiments (24 h, 6, 9, and 14 days). The form A of the sodium salt of (R)-4-(1-(6-(4-(trifluoromethyl)benzyl)-6-azaspiro[2.5]octane-5-carboxamido)cyclopropyl)benzoic acid resulted to be extremely effective in preventing in vitro osteoblast proliferation stimulated by IL1b.

The results are reported in FIG. 11 (a and b), that illustrates how low concentrations of the compound of the invention were able to dose-dependently counteract osteoblast proliferation in this paradigm. (R)-4-(1-(6-(4-(trifluoromethyl)benzyl)-6-azaspiro[2.5]octane-5-carboxamido)cyclopropyl)benzoic acid resulted to be extremely effective in preventing in vitro osteoblast proliferation stimulated by IL1b.

The fact that the compound of the invention was capable to counteract pathological osteoblast proliferation was surprising, being the pathological osteoblast proliferation a mechanism essential for determining heterotopic ossification.

Example 8: Effect of the Form A of the Sodium Salt of (R)-4-(1-(6-(4-(trifluoromethyl)benzyl)-6-azaspiro[2.5]octane-5-carboxamido)cyclopropyl) Benzoic Acid on Human T-Helper (Th) Cell Polarization from Healthy Volunteers In this model the ability of the Form A of the sodium salt of (R)-4-(1-(6-(4-(trifluoromethyl)benzyl)-6-azaspiro[2.5]octane-5-carboxamido)cyclopropyl)benzoic acid to interacts with the immunological features able to influence pathological bone formation was studied. Specifically, the effect of the Form A of the sodium salt of (R)-4-(1-(6-(4-(trifluoromethyl)benzyl)-6-azaspiro[2.5]octane-5-carboxamido)cyclopropyl)benzoic acid on the Th-cell polarization in human Tcells stimulated by inflammatory agents was studied. In this paradigm it was valuated whether the Form A of the sodium salt of (R)-4-(1-(6-(4-(trifluoromethyl)benzyl)-6-azaspiro[2.5]octane-5-carboxamido)cyclopropyl)benzoic acid was capable to counteract the polarization towards a phenotype expressing IL-17F, being this cytokine strongly associated with heterotopic osteogenesis.

In particular, it was evaluated if the compound was capable to orientate the polarization of Th cells towards a population less active in inducing this pathological phenomenon.

Material and Methods

Figure 12:
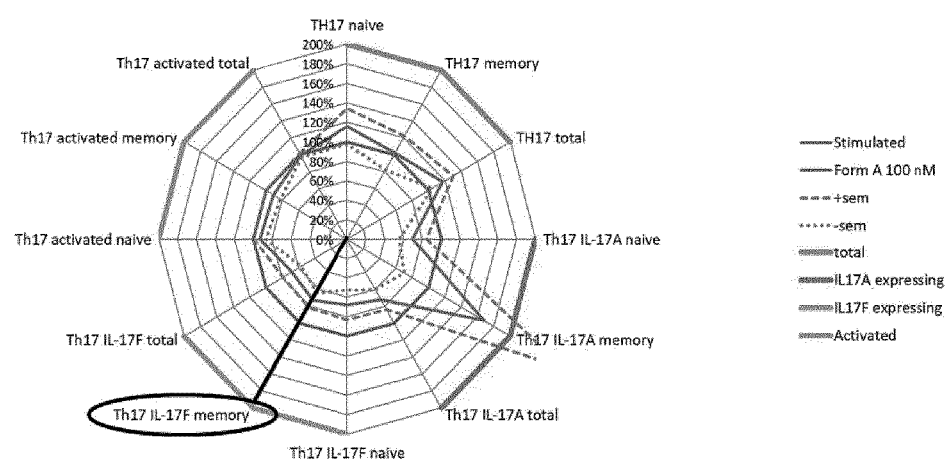
FIG. 12 shows the effect of the form A of the sodium salt of (R)-4-(1-(6-(4-(trifluoromethyl)benzyl)-6-azaspiro[2.5]octane-5-carboxamido)cyclopropyl)benzoic acid on the Thcell polarization in human Tcells stimulated by inflammatory agents. In this paradigm the form A of the sodium salt of (R)-4-(1-(6-(4-(trifluoromethyl)benzyl)-6-azaspiro[2.5]octane-5-carboxamido)cyclopropyl)benzoic acid was surprisingly capable to counteract the polarization towards a phenotype expressing IL-17F. This cytokine is strongly associated with osteogenesis.
Figure 12:
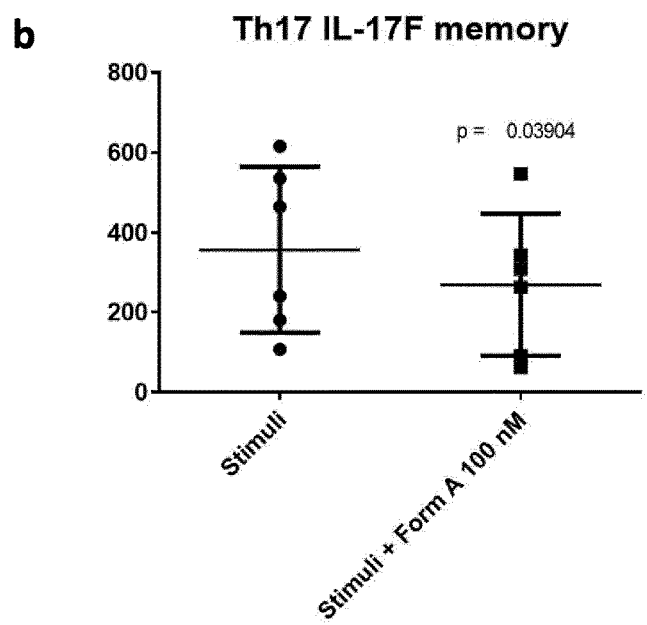

This experiment was performed on PBMC's from healthy volunteers. PBMC's were activated using two interleukins, namely, rIL-2 and rIL-21, both at a concentration of 5 ng/ml in combination with anti-CD3 and anti-CD28 (both at 1.5 ng/ml) co-stimulated with PGE2 at concentrations of 30 nM over a 48 hour (Day 2) incubation period (refer to table below for assay layout) as well as with the Form A of the sodium salt of (R)-4-(1-(6-(4-(trifluoromethyl)benzyl)-6-azaspiro[2.5]octane-5-carboxamido)cyclopropyl)benzoic acid at concentrations of 100 nM. The data were generated by flow cytometry for surface expression of CD3, CD4, CCR6, CD45RO, CD25, intracytoplasmic expression of IL17A and IL17F The results are reported in FIG. 12. FIG. 12 illustrates that in different healthy volunteers the compound of the invention at 100 nM was surprisingly capable to reduce significantly the polarization of Th17 cells towards a population capable to produce IL-17F (Th17F), in particular towards Th17 IL-17F memory cells (as illustrated in the spydergram in FIG. 12a). The effect is statistically significant in spite of the low numerosity of samples (FIG. 12b). This was particularly relevant since IL-17F is emerging as a primary stimulus for osteogenesis (Wang Y et al, Bone 116 (2018) 47-57).

The surprising activity of the compound of the invention against Th17 IL-17F memory cell polarization could explain the peculiar effectiveness of the compound against pathological heterotopic ossification.

The invention claimed is:

1. A method for the prevention of heterotopic ossification in a subject affected by a disease selected from the group consisting of Myositis Ossificans, Post Surgical Heterotopic Ossification, Post-Injury Ossification, Osteosarcoma, at least one Spondyloarthropathy, at least one Seronegative arthropathy, Diffuse idiopathic skeletal hyperostosis, Para-articular Ossification, at least one Crystal-Induced Arthropathy, Osteoarthritis driven by degenerative processes, Hyperparathyroidism, Drug-Induced Ossification, and Ochronosis, Diffuse Idiopathic Skeletal Hyperstosis, Fibrodysplasia ossificans progressive, Synovial Endochromatosis and Progressive Osseous Heteroplasia, wherein said method comprises the step of administering to the subject a compound of formula (R)-4-(1-(6-(4-(trifluoromethyl)benzyl)-6-azaspiro[2.5]octane-5-carboxamido)-cyclopropyl)benzoic acid or a pharmaceutically acceptable salt thereof.

2. The method of claim 1, wherein the pharmaceutically acceptable salt is the sodium salt.

3. The method of claim 2, wherein the sodium salt of (R)-4-(1-(6-(4-(trifluoromethyl)benzyl)-6-azaspiro[2.5]octane-5-carboxamido)-cyclopropyl)benzoic acid is a polymorphic form of sodium salt of (R)-4-(1-(6-(4-(trifluoromethyl)benzyl)-6-azaspiro[2.5]octane-5-carboxamido) cyclopropyl)benzoic acid characterized by a powder XRD spectrum with peaks at values of the angle 2θ±0.2° of 4.3, 5.0, 5.8, 6.4, 7.1, 8.3, 8.7, 12.8, 15.3, 15.9 (form A), said powder XRD spectrum recorded using a Cu K(α) radiation source, with wavelength values $\lambda_1$=1.54051 Å and $\lambda_2$=1.54430 Å.

4. The method according to claim 1, wherein the compound of formula (R)-4-(1-(6-(4-(trifluoromethyl)benzyl)-6-azaspiro[2.5]octane-5-carboxamido)cyclopropyl)benzoic acid or its salt or the form A of its sodium salt is in a dose in the range from 1 to 30 mg/kg.

5. The method according claim 4, wherein the compound of formula (R)-4-(1-(6-(4-(trifluoromethyl)benzyl)-6-azaspiro[2.5]octane-5-carboxamido)-cyclopropyl)benzoic acid or its salt or the form A of its sodium salt is in a dose in the range from 8 to 20 mg/kg.

6. The method according claim 5, wherein the compound of formula (R)-4-(1-(6-(4-(trifluoromethyl)benzyl)-6-azaspiro[2.5]octane-5-carboxamido)-cyclopropyl)benzoic acid or its salt or the form A of its sodium salt is in a dose of about 10 mg/kg.

7. The method according to claim 1, wherein the at least one Spondyloarthropathy is selected from the group consisting of Ankylosing spondylitis and Psoriatic arthritis.

8. The method according to claim 1, wherein the Diffuse Idiopathic Skeletal Hyperstosis is caused by metabolic and/or degenerative processes.

9. A method for the prevention of heterotopic ossification in a subject affected by a disease selected from the group consisting of Myositis Ossificans, Post Surgical Heterotopic Ossification, Post-Injury Ossification, Osteosarcoma, at least one Spondyloarthropathy, at least one Seronegative arthropathy, Diffuse idiopathic skeletal hyperostosis, Para-articular Ossification, at least one Crystal-Induced Arthropathy, Osteoarthritis driven by degenerative processes, Hyperparathyroidism, Drug-Induced Ossification, and Ochronosis, Diffuse Idiopathic Skeletal Hyperstosis, Fibrodysplasia ossificans progressive, Synovial Endochromatosis and Progressive Osseous Heteroplasia, wherein said method comprises the step of administering to the subject a pharmaceutical composition comprising the compound of formula (R)-4-(1-(6-(4-(trifluoromethyl)benzyl)-6-azaspiro[2.5]octane-5-carboxamido)cyclopropyl)-benzoic acid or a pharmaceutically acceptable salt or the form A of its sodium salt and at least one pharmaceutically acceptable excipient.

10. The method according to claim 9, wherein the compound of formula (R)-4-(1-(6-(4-(trifluoromethyl)benzyl)-6-azaspiro[2.5]octane-5-carboxamido)cyclopropyl)benzoic acid or its salt or the form A of its sodium salt is in a dose in the range from 1 to 30 mg/kg.

11. The method according claim 10, wherein the compound of formula (R)-4-(1-(6-(4-(trifluoromethyl)benzyl)-6-azaspiro[2.5]octane-5-carboxamido)-cyclopropyl)benzoic acid or its salt or the form A of its sodium salt is in a dose in the range from 8 to 20 mg/kg.

12. The method according claim 11, wherein the compound of formula (R)-4-(1-(6-(4-(trifluoromethyl)benzyl)-6-azaspiro[2.5]octane-5-carboxamido)-cyclopropyl)benzoic acid or its salt or the form A of its sodium salt is in a dose of about 10 mg/kg.

13. The method according to claim 9, wherein the at least one Spondyloarthropathy is selected from the group consisting of Ankylosing spondylitis and Psoriatic arthritis.

14. The method according to claim 9, wherein the Diffuse Idiopathic Skeletal Hyperstosis is caused by metabolic and/or degenerative processes.

* * * * *